United States Patent
Choi

(10) Patent No.: US 7,760,838 B2
(45) Date of Patent: Jul. 20, 2010

(54) DESKEWING METHOD AND APPARATUS, AND DATA RECEPTION APPARATUS USING THE DESKEWING METHOD AND APPARATUS

(75) Inventor: Young-don Choi, Anseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1022 days.

(21) Appl. No.: 11/496,797

(22) Filed: Aug. 1, 2006

(65) Prior Publication Data

US 2007/0297551 A1 Dec. 27, 2007

(30) Foreign Application Priority Data

Jun. 27, 2006 (KR) .................. 10-2006-0058182

(51) Int. Cl.
*H04L 7/00* (2006.01)
*H04L 25/00* (2006.01)
*H04L 25/40* (2006.01)

(52) U.S. Cl. ............... 375/371; 375/372; 375/375; 375/376; 327/147; 327/149; 327/153; 327/156; 327/158; 327/161

(58) Field of Classification Search ......... 375/371–376; 327/147–163
See application file for complete search history.

(56) References Cited

U.S. PATENT DOCUMENTS

2002/0085656 A1 7/2002 Lee et al.
2006/0280272 A1* 12/2006 Stojanovic .................. 375/355

FOREIGN PATENT DOCUMENTS

JP 2001-339445 12/2001
JP 2002-084247 3/2002
KR 100350498 B1 8/2002

* cited by examiner

*Primary Examiner*—Curtis B Odom
(74) *Attorney, Agent, or Firm*—F. Chau & Associates, LLC

(57) ABSTRACT

Deskewing method and apparatus, including: an up/down detection unit samples a received data signal and determines in which of first through third areas of the data signal the logic level of the data signal transitions by using the result of the sampling, a lower limit detection unit detects a lower limit of the first area if the logic level of the data signal transitions in the first area, an upper limit detection unit detects an upper limit of the third area if the logic level of the data signal transitions in the third area, a phase detection unit determines a delay amount according to the upper limit detected by the upper limit detection unit and the lower limit detected by the lower limit detection unit, a buffer unit delays the data signal by the delay amount determined by the phase detection unit.

32 Claims, 14 Drawing Sheets

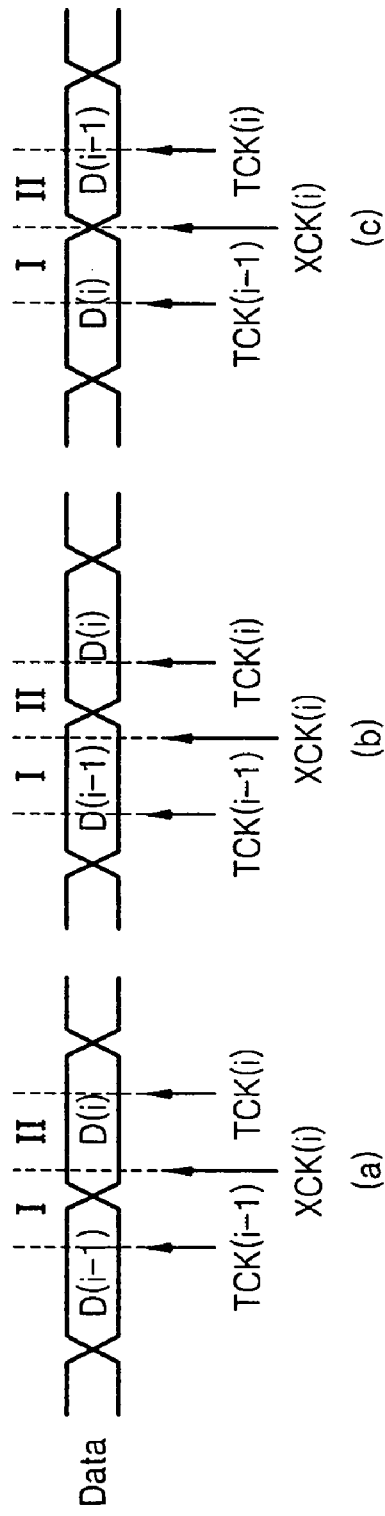

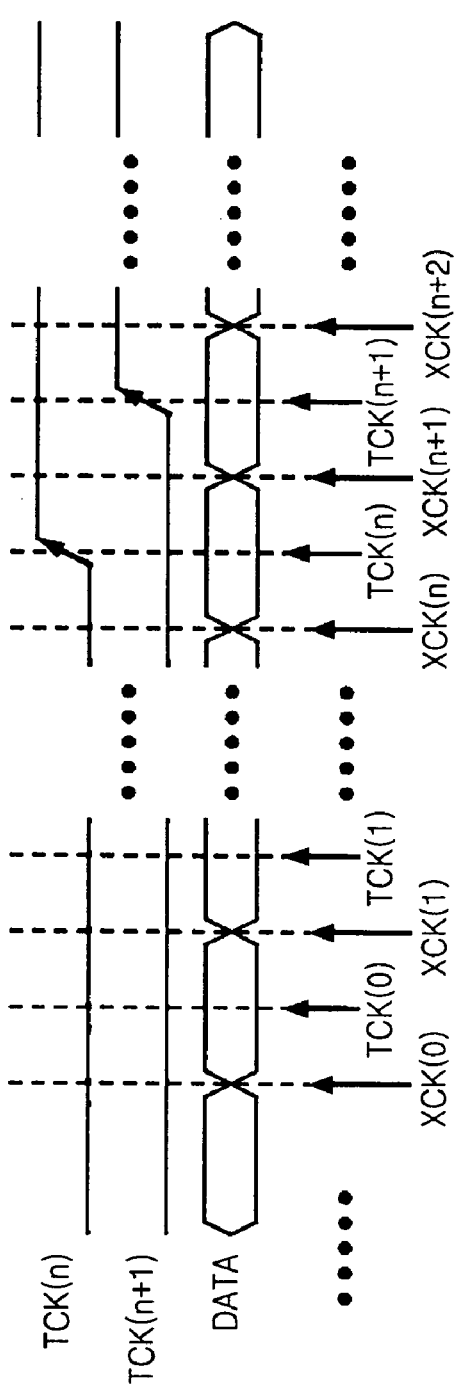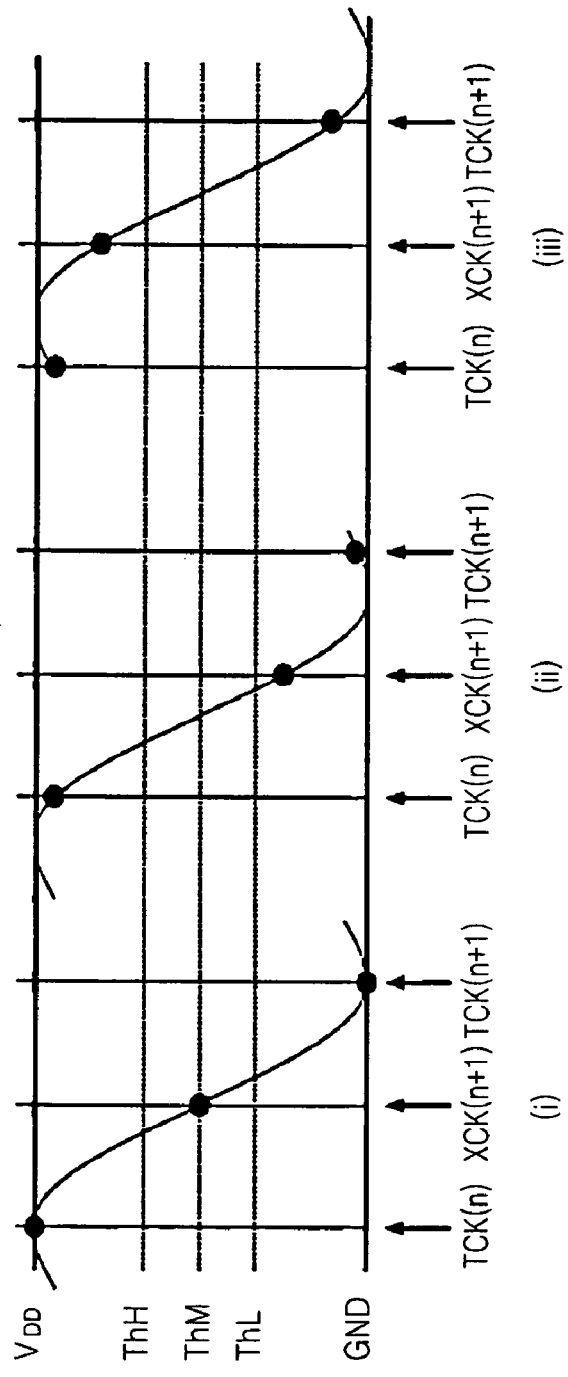
FIG. 5A
FIG. 5B

US 7,760,838 B2

DESKEWING METHOD AND APPARATUS, AND DATA RECEPTION APPARATUS USING THE DESKEWING METHOD AND APPARATUS

CROSS-REFERENCE TO RELATED PATENT APPLICATION

This application claims the benefit of Korean Patent Application No. 10-2006-0058182, filed on Jun. 27, 2006, in the Korean Intellectual Property Office, the disclosure of which is incorporated herein in its entirety by reference.

BACKGROUND OF THE INVENTION

1. Technical Field

The present disclosure relates to a semiconductor memory device, and more particularly, to a deskewing method and apparatus and a data reception apparatus using the deskewing method and apparatus in a semiconductor memory device.

2. Discussion of the Related Art

As the speed of communications between semiconductor chips increases, skew and jitter in data transmitted between the semiconductor chips become more severe and problematic. Accordingly, in order to restore desired data during communication between semiconductor chips, clock skew and clock jitter must be minimized for data transmitted between the semiconductor chips.

To improve communications, a method of matching printed circuit board (PCB) lines or signal lines in a semiconductor chip is used. This method, however, imposes restrictions on the routing of signals, thereby increasing manufacturing costs.

Furthermore, even though PCB lines or signal lines are properly matched with one another, data skews are likely to occur due to inevitable factors such as manufacturing process, voltage, and temperature variations. Due to such data skews, errors in the restoration of data are inevitable. Thus, it is necessary to develop improved methods to restore data in consideration of these data skews.

Furthermore, with the ever-growing demand for low power consumption semiconductor devices, semiconductor memory devices supporting a power down mode to reduce power consumption have been manufactured. While semiconductor chips that support the power down mode are powered on and off, however, jitter accumulates. Such accumulated jitter adversely affects the restoration of data.

In order to address the problem of restoration of data due to skew and jitter in data signals, an analog deskewing method has been suggested. The analog deskewing method, however, is likely to result in long lock times. In addition, when the analog deskewing method is applied to the situation when there are few logic level transitions in a data signal, that is, data value variations, leakage is likely to occur, thereby failing to properly maintain a locked state. In order to maintain a locked state, power is continuously required to be consumed. In this regard, it is necessary to perform a deskewing operation in a digital manner.

SUMMARY OF THE INVENTION

Exemplary embodiments of the present invention provide a deskewing apparatus which performs a deskewing operation in a digital manner, and a data reception apparatus using the deskewing apparatus.

According to an exemplary embodiment of the present invention, there is provided a deskewing method comprising: (i) sampling a received data signal in response to a data sampling clock signal, a first edge sampling clock signal, and a second edge sampling clock signal and determining in which of first through third areas the logic level of the received data signal transitions by using the results of the sampling, wherein the data sampling clock signal, the first edge sampling clock signal, and the second edge sampling clock signal are sequentially activated; (ii) detecting an upper limit and/or a lower limit in whichever of the first through third areas the logic level of the sampled data transitions according to the results of the determining performed in (i); and (iii) delaying the sampled data by a delay amount determined according to the detected upper limit and/or lower limit.

According to an exemplary embodiment of the present invention, there is provided a deskewing apparatus comprising: an up/down detection unit that samples a data signal received in response to a data sampling clock signal, a first edge sampling clock signal, and a second edge sampling clock signal and determines in which of first through third areas of the data signal the logic level of data signal obtained as the result of the sampling transitions, wherein the data sampling clock signal, the first edge sampling clock signal, and the second edge sampling clock signal are sequentially activated; a lower limit detection unit that detects a lower limit in the first area if the logic level of the data signal transitions in the first area; an upper limit detection unit that detects an upper limit in the third area if the logic level of the data signal transitions in the third area; a phase detection unit that determines a delay amount indicating the amount by which the data signal is to be delayed according to the upper limit detected by the upper limit detection unit and the lower limit detected by the lower limit detection unit; and a buffer unit that delays the data signal by the delay amount determined by the phase detection unit.

According to an exemplary embodiment of the present invention, there is provided a data reception apparatus that receives a plurality of data signals respectively transmitted via a plurality of data lines and a clock signal, the data reception apparatus comprising: a plurality of data buffer units that are respectively connected to the data lines and buffer the plurality of data signals; a clock signal buffer unit that buffers the clock signal; and a plurality of deskewing units each deskewing unit being connected to a predefined number of data buffer units of the data buffer units and compensating for jitter and skew included in the plurality of data signals respectively input to the predefined number of data buffer units by adjusting the clock signal by an amount corresponding to the jitter and skew, wherein the data buffer units respectively buffers the plurality of data signals in response to the adjusted clock signal.

According to an exemplary embodiment of the present invention, there is provided a data reception apparatus that receives a plurality of data signals respectively transmitted via a plurality of data lines and a clock signal, the data reception apparatus comprising: a plurality of data buffer units that are respectively connected to the data lines and buffer the plurality of data signals; a clock signal buffer unit that buffers the clock signal; and a deskewing unit that is connected to the data buffer units and compensates for jitter and skew included in the plurality of data signals respectively input to the data buffer units by adjusting the clock signal by an amount corresponding to the jitter and skew, wherein the data buffer units respectively buffer the plurality of data signals in response to the adjusted clock signal.

According to an exemplary embodiment of the present invention, there is provided a data reception apparatus that receives a plurality of data signals respectively transmitted via a plurality of data lines and a clock signal, the data reception apparatus comprising: a plurality of deskewing units that are respectively connected to the data lines and adjust jitter and/or skew included in each of the plurality of data signals by adjusting the corresponding data signals by an amount corresponding to the jitter and/or skew; a plurality of data buffer units that are respectively connected to the deskewing units and buffer the data signals adjusted by the deskewing units; and a clock signal buffer unit that buffers the clock signal, wherein the data buffer units respectively buffer the results of the adjustment performed by the deskewing units in response to the clock signal.

According to an exemplary embodiment of the present invention, there is provided a data reception apparatus that receives a plurality of data signals respectively transmitted via a plurality of data lines and a clock signal, the data reception apparatus comprising: a plurality of deskewing units each deskewing unit being connected to a predefined number of data lines of the plurality of data lines and compensating for jitter and skew included in the data signals transmitted via the plurality of data lines by adjusting the corresponding data signals by a predetermined amount corresponding to the jitter and skew; a plurality of data buffer units that respectively correspond to the data lines, wherein each of the deskewing units is connected to a predefined number of the data buffer units and the predefined number of data buffer units buffer the data signals adjusted by the deskewing units to which the predefined number of data buffer units correspond; and a clock signal buffer unit that buffers the clock signal, wherein the data buffer units buffer the data signals adjusted by the deskewing units in response to the clock signal.

According to an exemplary embodiment of the present invention, there is provided a data reception apparatus that receives a plurality of data signals transmitted via a plurality of data lines and a clock signal, the data reception apparatus comprising: a deskewing unit which is connected to the data lines and compensates for jitter and/or skew included in each of the plurality of data signals by adjusting the corresponding data signals by an amount corresponding to the jitter and/or skew; a plurality of data buffer units that are connected to the deskewing unit, respectively correspond to the data lines, and buffer the results of the adjustment performed by the deskewing unit; and a clock signal buffer unit that buffers the clock signal, wherein the data buffer units buffer the data signals adjusted by the deskewing units in response to the clock signal.

BRIEF DESCRIPTION OF THE DRAWINGS

Exemplary embodiments of the present invention will be understood in more detail from the following descriptions taken in conjunction with the attached drawings in which:

FIG. 2 is a diagram for explaining a method of determining an optimized sampling location using a two-time oversampling method;

FIG. 3 is a diagram for explaining a method of determining an optimized sampling location using a three-time oversampling method;

FIG. 5 is a diagram for explaining the operation of the deskewing apparatus illustrated in FIG. 4;

DETAILED DESCRIPTION OF THE INVENTION

Figure 1A:
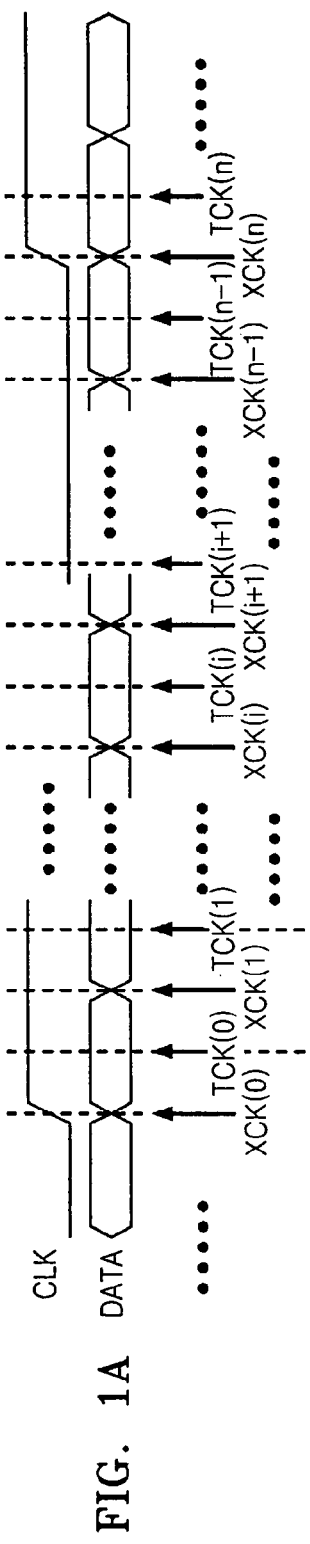
FIG. 1 is a timing diagram illustrating the relationship between a received data signal and a clock signal when transmitting data at a data rate n.

Exemplary embodiments of the present invention will now be described more fully with reference to the accompanying drawings. In the drawings, like reference numerals represent like elements.

Exemplary embodiments of the present invention will hereinafter be described in detail focusing more on receiving of a data signal having jitter and/or skew, however, exemplary embodiments of the present invention can also be applied to any data signal comprising jitters and/or skews.

Figure 1B:
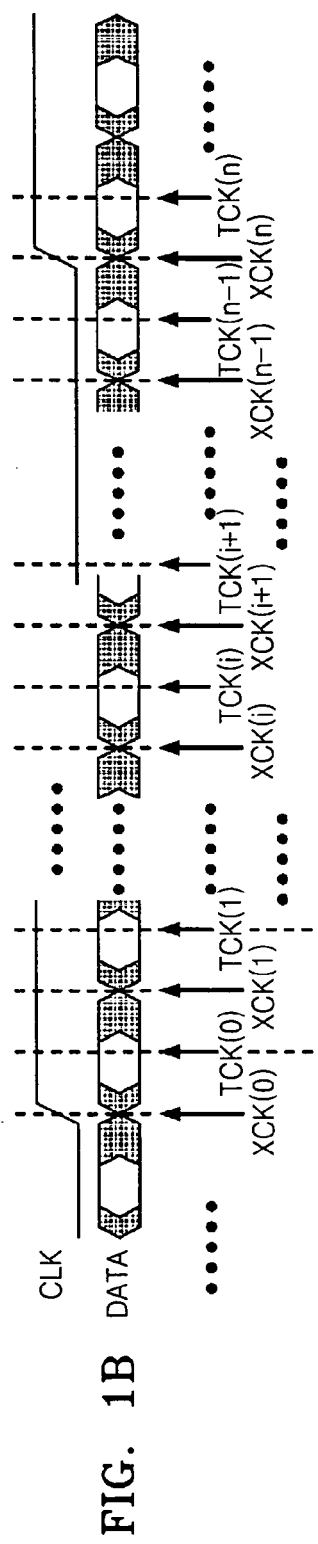
Figure 1C:
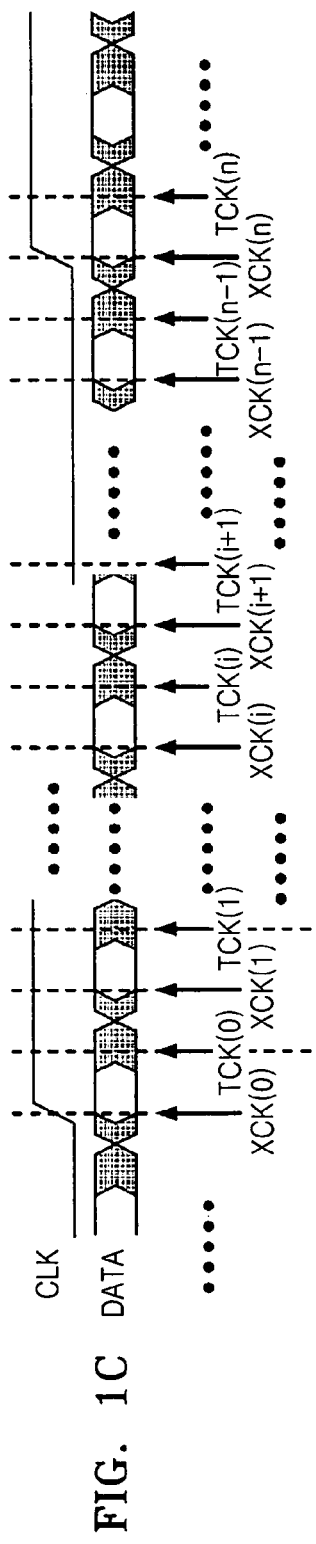

FIGS. 1A-1C are timing diagrams illustrating the relationship between a received data signal and a clock signal when transmitting data at a data rate of n. When transmitting data at a data rate of n, a total of n bits are transmitted during one cycle of a clock signal CLK. Referring to FIGS. 1A-1C, XCK represents an edge sampling clock signal, TCK represents a data sampling clock signal, and DATA represents a received data signal. The data signal DATA is sampled in response to the data sampling clock signal TCK.

FIG. 1A illustrates an ideal situation when the data signal DATA and the clock signal CLK are properly synchronized. Referring to FIG. 1A, the edge sampling clock signal XCK is synchronized with an edge of the data signal DATA, that is, the time when the data signal DATA transits from a low level to a high level or vice versa, and the data sampling clock signal TCK falls in the middle of a time period during which the logic of the data signal DATA is maintained. Accordingly, sampling can be performed at the middle of a time period during which the logic level of the data signal DATA is maintained.

FIG. 1B illustrates a situation when the data signal DATA includes jitter. Referring to FIG. 1B, shaded portions represent invalid sampling windows where data cannot be validly sampled due to jitter, and non-shaded portions represent valid sampling windows where data can be validly sampled. The edge sampling clock signal XCK is synchronized with an edge of the data signal DATA, however, the area of a valid sampling window decreases due to the jitter. Accordingly, the data sampling clock signal TCK may not fall on the center of a valid sampling window. In other words, it may not be possible to perform sampling at the center of a valid sampling window.

FIG. 1C illustrates a situation when the data signal DATA includes both jitter and skew. The situation illustrated in FIG. 1C is worse than the situation when the data signal DATA includes only jitter. Referring to FIG. 1C, the edge sampling clock signal XCK may not be synchronized with an edge of the data signal DATA. As a result, the data sampling clock signal TCK may not be able to fall within a valid sampling window. In this case, it is highly likely that errors will be present in the data restored from the data signal DATA.

In order to address the aforementioned problems associated with data restoration caused by jitter and/or skew, a two-time oversampling method and a three-time oversampling method have been proposed.

FIGS. 2A-2C are diagrams for explaining the determining of an optimized sampling location using the two-time oversampling method. In the two-time oversampling method, it is determined whether an edge of data signal DATA falls within zone I or zone II, it is determined whether to shift the data signal DATA or the sampling clock signals TCK and XCK forward or backward according to whether an edge of the data signal DATA falls within zone I or zone II, and then, the data signal DATA or the sampling clock signals TCK and XCK are repeatedly shifted forward or backward, thereby aligning the data signal DATA with the sampling clock signals TCK and XCK, as illustrated in FIG. 2C.

More specifically, FIG. 2A illustrates a situation when the data signal DATA is early relative to the sampling clock signals TCK and XCK. An edge of the data signal DATA falls within zone I. In this case, the sampling clock signals TCK and XCK are shifted forward, or the data signal DATA is shifted backward.

FIG. 2B illustrates a situation when the data signal DATA is late relative to the sampling clock signals TCK and XCK. In this case, the data signal DATA is shifted forward, or the sampling clock signals TCK and XCK are shifted backward.

In short, the data signal DATA can be properly aligned with the sampling clock signals TCK and XCK, as illustrated in FIG. 2C, by repeatedly performing the operation described above with reference to FIG. 2A or FIG. 2B. The data signal DATA or the sampling clock signals TCK and XCK can be shifted backward by appropriately delaying the data signal DATA or the sampling clock signals TCK and XCK.

FIGS. 3A-3C are diagrams for explaining the determining of an optimized sampling location using the three-time oversampling method. In the three-time oversampling method, unlike in the two-time oversampling method, a sampling operation is performed twice in an edge area in response to a left edge sampling clock signal LCK and a right edge sampling clock signal RCK. More specifically, in the three-time oversampling method, it is determined whether an edge of a data signal DATA falls within zone I, zone II, or zone III, it is determined whether to shift the data signal DATA or sampling clock signals TCK, LCK, and RCK forward or backward according to whether an edge of the data signal DATA falls within zone I, zone II, or zone III, and then, the data signal DATA or the sampling clock signals TCK, LCK, and RCK are repeatedly shifted forward or backward, thereby aligning the data signal DATA with the sampling clock signals TCK, LCK, and RCK, as illustrated in FIG. 3C.

More specifically, FIG. 3A illustrates a situation when the data signal DATA is early relative to the sampling clock signals TCK, LCK, and RCK. Referring to FIG. 3A, an edge of the data signal DATA falls within zone I. In this case, the sampling clock signals TCK, LCK, and RCK are shifted forward, or the data signal DATA is shifted backward.

FIG. 3B illustrates a situation when the data signal DATA is late relative to the sampling clock signals TCK, LCK, and RCK. Referring to FIG. 3B, an edge of the data signal DATA falls within zone III. In this case, the data signal DATA is shifted forward, or the sampling clock signals TCK, LCK, and RCK are shifted backward.

When an edge of the data signal DATA falls within zone II, it can be seen that the sampling is precisely synchronized. Thus, there is no need to shift the data signal DATA or the sampling clock signals TCK, LCK, and RCK forward or backward. Zone II is referred to as a dead zone, and a phase detection method using a dead zone is referred to as a deadzone phase detection method.

In short, the data signal DATA can be properly aligned with the sampling clock signals TCK, LCK, and RCK, as illustrated in FIG. 3C, by repeatedly performing the operation described above with reference to FIG. 3A or FIG. 3B.

Figure 4:
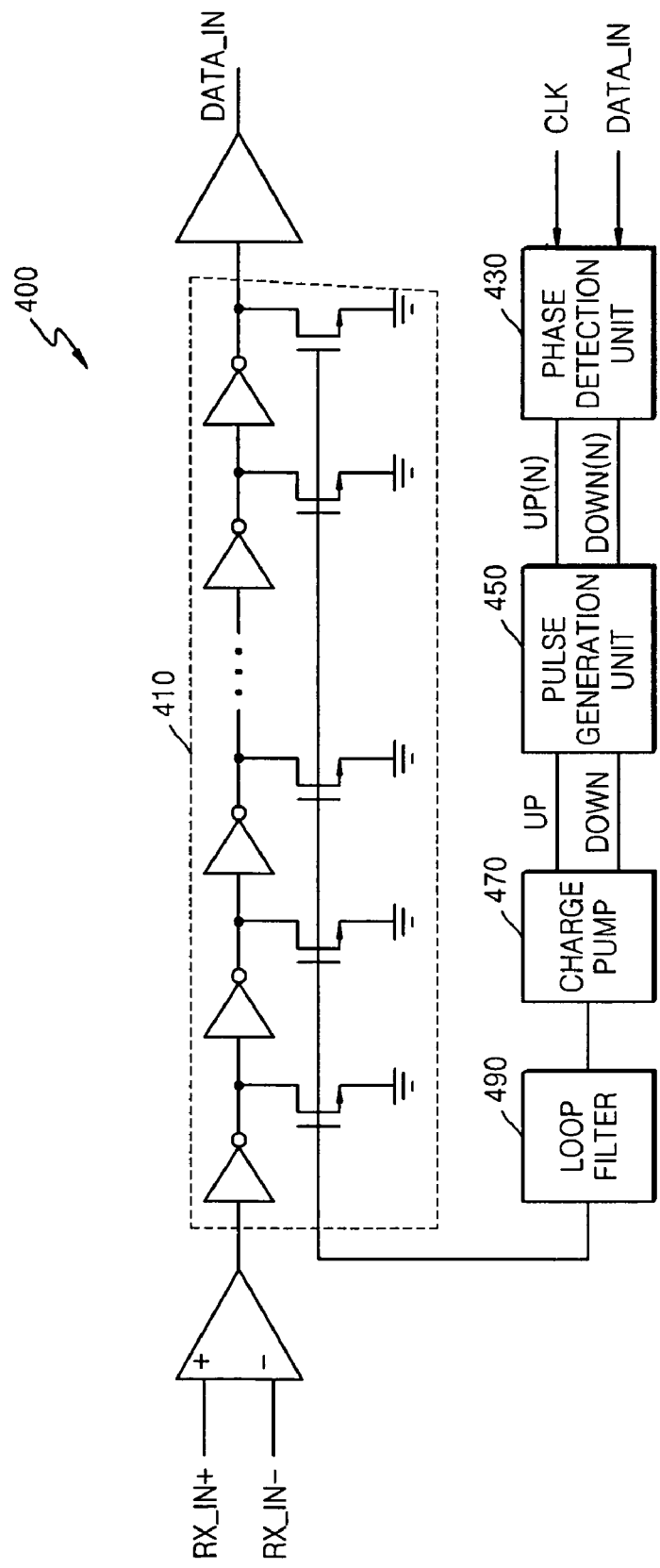
FIG. 4 is a block diagram of a deskewing apparatus that performs a deskewing operation in an analog manner.

FIG. 4 is a block diagram of a deskewing apparatus 400 that performs a deskewing operation in an analog manner, and FIG. 5 is a diagram for explaining the operation of the deskewing apparatus 400 illustrated in FIG. 4. The deskewing apparatus 400 illustrated in FIG. 4 determines an optimum sampling location using an analog delayed locked loop (DLL) and adopts the two-time oversampling method. The structure and operation of the deskewing apparatus 400 will hereinafter be described in detail with reference to FIGS. 4 and 5.

Referring to FIG. 4, the deskewing apparatus 400 includes a voltage-controlled delay unit 410, a phase detection unit 430, a pulse generation unit 450, a charge pump 470, and a loop filter 490. The phase detection unit 430 detects a difference between the phase of an ideal sampling location and the phase of an actual sampling location using sampling clock signals TCK and XCK and a data signal DATA_IN. The principles of detection of a difference between the phase of an ideal sampling location and the phase of an actual sampling location will hereinafter be described in detail with reference to FIG. 5.

FIGS. 5A and 5B are timing diagrams for illustrating a situation when sampling is ideally performed. Referring to FIG. 5A, a sampling clock signal XCK is synchronized with a logic level of a data signal DATA transitions, and a sampling clock signal TCK falls on the center of a valid data section where valid data exists.

FIG. 5B illustrates the relationship between a data signal DATA_IN input to the phase detection unit 430 and the sampling clock signals TCK and XCK. The deskewing apparatus 400 is described above as using the two-time oversampling, method, however, the deskewing apparatus 400 can perform phase detection using two reference voltages ThH and ThL in a similar manner to the manner used in the three-time oversampling method to perform phase detection.

Referring to FIG. 5B, the phase detection unit 430 uses a predetermined sample logic level obtained using the edge sampling clock signal XCK. If the predetermined sample logic level is between the two reference voltages ThH and ThL, as illustrated in FIG. 5B(i) the phase detection unit 430 determines that sampling has been performed at an appropriate sampling location and may not output any signal.

If the predetermined sample logic level is lower than the reference voltage ThL, as illustrated in FIG. 5B(ii), the phase detection unit 430 outputs a signal DOWN(N) indicating that the predetermined sample logic level is lower than the reference voltage ThL. On the other hand, if the predetermined sample logic level is higher than the reference voltage ThH, as illustrated in FIG. 5B(iii), the phase detection unit 430 outputs a signal UP(N) indicating that the predetermined sample logic level is higher than the reference voltage ThH.

A voltage input to the voltage-controlled delay unit 410 is controlled in response to the signal UP(N) or the signal DOWN(N), and the amount by which the voltage input to the voltage-controlled delay unit 410 is to be delayed is determined according to the results of the control of the voltage controlled delay unit 410. By repeatedly performing these operations, the time when the logic level of the data signal DATA transitions is synchronized with the edge sampling clock signal XCK by a DLL block comprising the phase detection unit 430, the pulse generation unit 450, the charge pump 470, and the loop filter 490.

This type of deskewing method, however, is likely to produce different results according to the frequency of high to low state changes (or vice-versa) and the jitter distribution of the data signal DATA. Especially when a jitter distribution is asymmetrical, it may not be possible to properly determine an optimum sampling location. This problem arises because of the use of an analog DLL. Therefore, there is the need to perform a deskewing operation in a digital manner rather than an analog manner.

Figure 6:
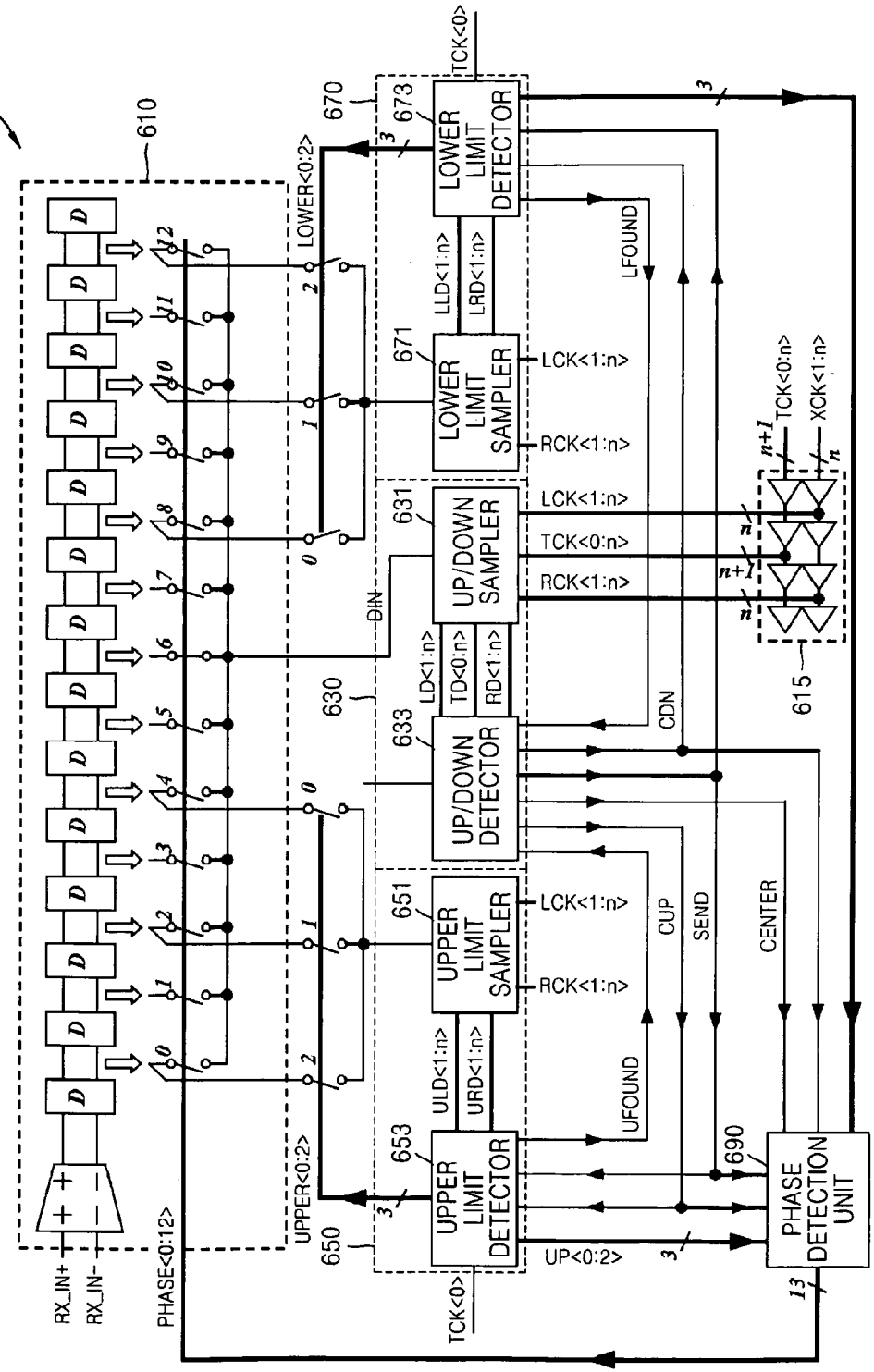
FIG. 6 is a block diagram of a deskewing apparatus according to an exemplary embodiment of the present invention.
Figure 7:
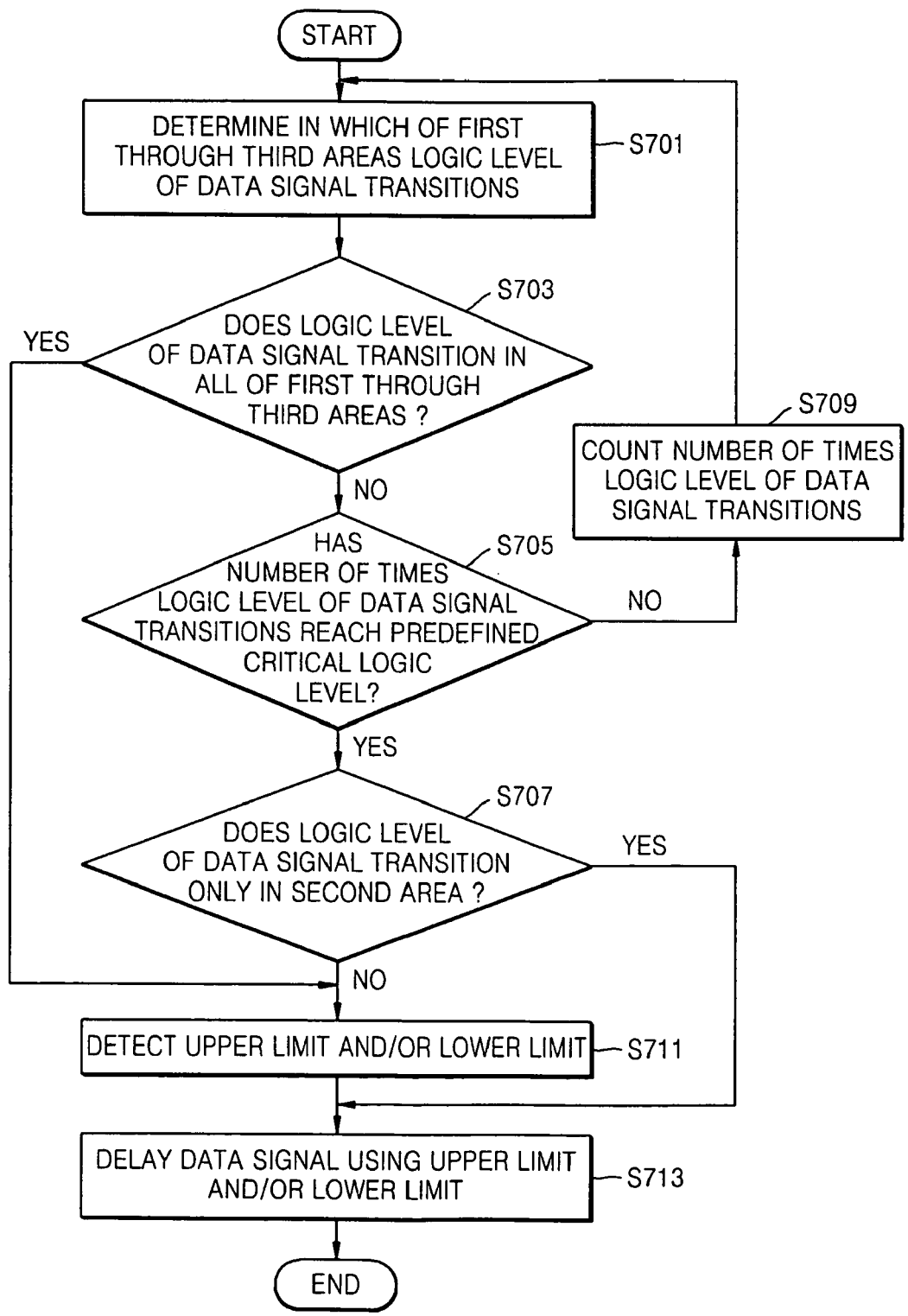
FIG. 7 is a flowchart illustrating a deskewing method according to an exemplary embodiment of the present invention.

FIG. 6 is a block diagram of a deskewing apparatus 600 according to an exemplary embodiment of the present invention, and FIG. 7 is a flowchart illustrating a deskewing method according to an exemplary embodiment of the present invention. The structure and operation of the deskewing apparatus 600 will be described later in detail with reference to FIGS. 6 and 7. First, the principles of operation of an exemplary embodiment of the present invention will hereinafter be described in detail with reference to FIGS. 8A-8C.

Figure 8A:
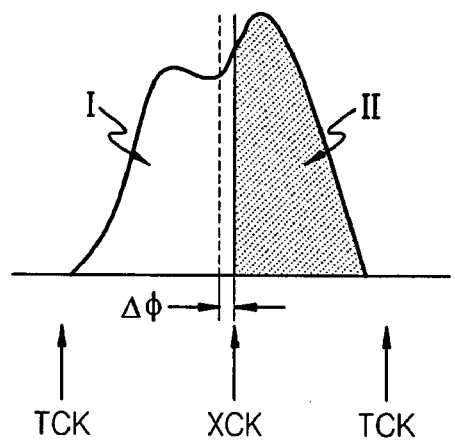
FIG. 8 is a diagram for explaining the principles of operation of exemplary embodiments of the present invention.
Figure 8B:
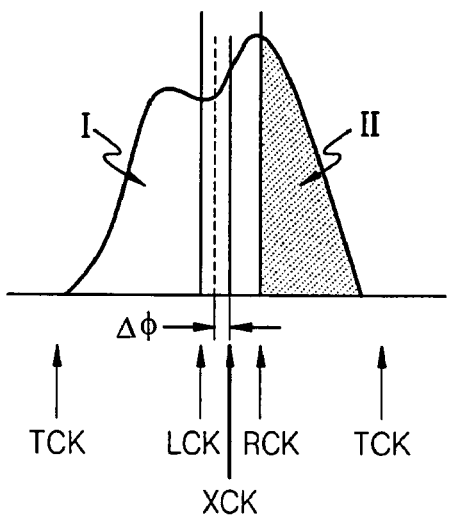
Figure 8C:
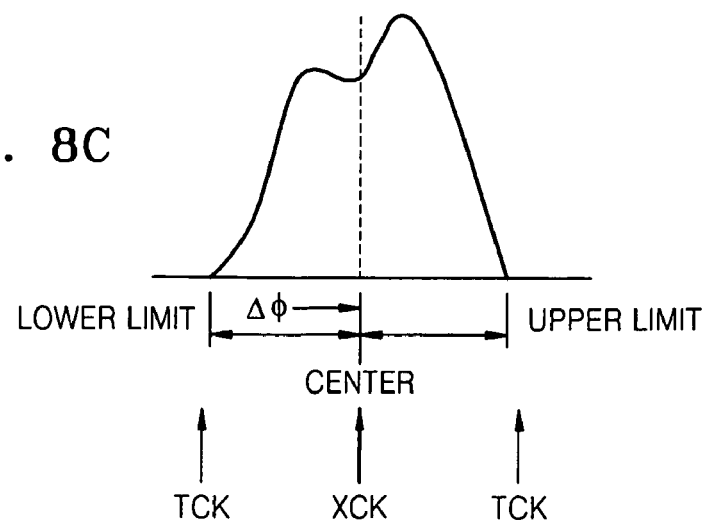

FIGS. 8A-C are diagrams for explaining the principles of operation of an exemplary embodiment of the present invention. In detail, FIGS. 8A through 8C respectively illustrate a jitter probability density function that represents the accumulated transition number of the value of the received data. In an ideal locked state, an edge sampling clock signal XCK falls on the center of an area where the jitter probability density function exists.

More specifically, FIG. 8A illustrates a locked state obtained using the two-time oversampling method, FIG. 8B) illustrates a locked state obtained using the three-time oversampling method, and FIG. 8C illustrates a locked state obtained using the deskewing apparatus of an exemplary embodiment of the present invention.

Referring to the jitter probability density function of FIG. 8A, an edge sampling clock signal XCK is positioned as indicated by a solid line so that area I becomes equal to area II. In this case, however, the edge sampling clock signal XCK deviates from an ideal position indicated by a dotted line by ΔΦ.

Referring to the jitter probability density function of FIG. 8B, a first edge clock signal LCK and a second edge clock signal RCK are positioned so that area I becomes equal to area II. In this case, however, a median point between the first edge clock signal LCK and the second edge clock signal RCK, that is, an edge sampling clock signal XCK deviates from an ideal edge sampling clock signal position indicated by a dotted line by ΔΦ.

The more asymmetric the jitter probability density function becomes, the more the first and second edge clock signals LCK and RCK deviate from the ideal edge sampling clock signal position.

Accordingly, in order to determine an ideal edge sampling clock signal (XCK) position, the upper and lower limits of a jitter probability density function need to be detected, and an edge sampling clock signal XCK needs to be positioned at a median point between the upper and lower limits of the jitter probability density function, as illustrated in FIG. 8C.

According to an exemplary embodiment of the present invention, an edge sampling clock signal XCK is positioned as determined according to the principles described above with reference to FIG. 8C. Therefore, the upper and lower limits of a jitter probability density function are detected, and a received data signal is sampled in response to a sampling clock signal determined according to the results of the detection.

More specifically, when an edge sampling clock signal is positioned at a median point between the upper and lower limits of a jitter probability density function, a data sampling clock signal has a phase difference of $\pi$ with respect to the edge sampling clock signal. Thus, a data signal received in an optimum locked state can be sampled by performing sampling at a position having a phase difference of $\pi$ with respect to the edge sampling clock signal.

The principles of operation of an exemplary embodiment of the present invention have been described above as being applied to the situation when a jitter probability density function is used, however, the principles of operation of an exemplary embodiment of the present invention can be applied to a probability density function associated with factors other than jitter that can affect the timing of a received data signal. For example, the principles of operation of an exemplary embodiment of the present invention can be applied to a skew probability density function or a jitter/skew probability density function.

Figure 9:
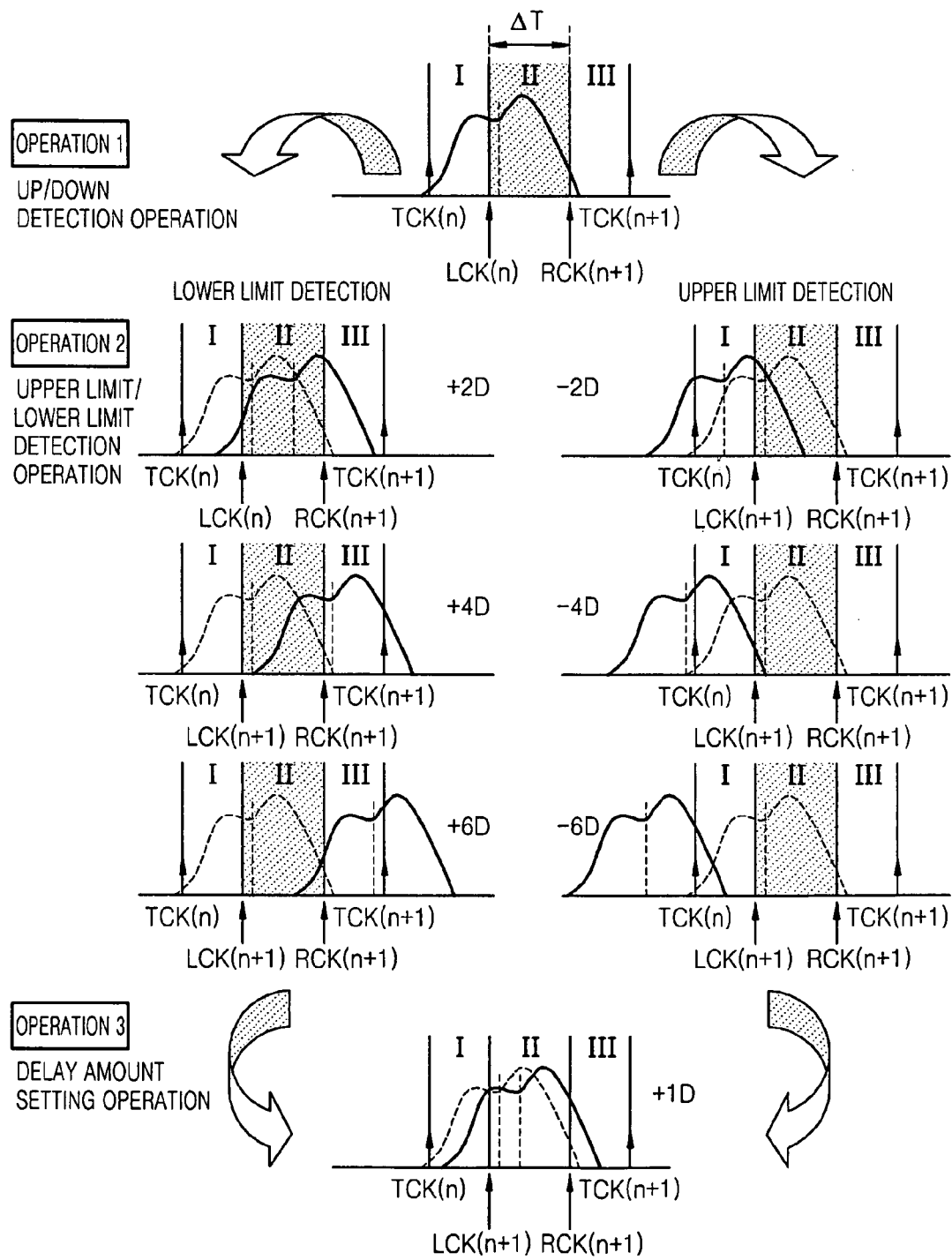
FIG. 9 is a diagram for explaining a plurality of operations of a deskewing method using a jitter probability density function according to an exemplary embodiment of the present invention.

The structure and operation of the deskewing apparatus 600 will hereinafter be described in detail with reference to FIGS. 6, 7, and 9. FIG. 9 is a diagram for explaining a deskewing method using a jitter probability density function according to an exemplary embodiment of the present invention.

According to an exemplary embodiment, data is received at a data rate of n through a transmitted data signal. The received data signal is converted into differential signals RX_IN+ and RX_IN−, and the differential signals RX_IN+ and RX_IN− are input to the deskewing apparatus 600. However, the present invention can be applied to the situation when the received data signal is input to the deskewing apparatus 600 as is.

In addition, according to an exemplary embodiment, a received data signal is sampled using sampling clock signals used in the three-time oversampling method, that is, using a data sampling clock signal TCK, a first edge sampling clock signal LCK, and a second edge sampling clock signal RCK, and an upper limit and a lower limit of the results of the sampling are detected.

As described above, according to an exemplary embodiment, the sampling clock signals used in the three-oversampling method are used. Referring to FIG. 9, first through third areas, that is, areas I through III, are defined by the data sampling clock signal, the first edge sampling clock signal LCK, and the second edge sampling clock signal RCK.

The data sampling clock signal TCK, the first edge sampling clock signal LCK, and the second edge sampling clock signal RCK are periodically activated. More specifically, the data sampling clock signal TCK, the first edge sampling clock signal, and the second edge sampling clock signal RCK are sequentially activated.

Jitter probability density functions illustrated in FIG. 9 represent the accumulated transition number of the value of the received data signal in relation to the data sampling clock signal TCK, the first edge sampling clock signal LCK, and the second edge sampling clock signal RCK, which are sequentially activated. Ideally, the logic level of a received data signal transitions at a center point between the first edge sampling clock signal LCK and the second edge sampling clock signal RCK. Thus, it is preferable that the logic level of a received data signal transitions at the median point between the first edge sampling clock signal LCK and the second edge sampling clock signal RCK.

A plurality of received data signals may have different jitter properties. Statistically, the jitter properties of a considerable number of data signals transmitted at the same data rate via the same transmission channel are substantially the same. Therefore, according to an exemplary embodiment, a sufficiently large number of data signals are received to accurately analyse statistical jitter properties, and then an upper limit and a lower limit of a jitter probability density function are detected.

Referring to FIG. 6, the deskewing apparatus 600 includes an up/down detection unit 630, a lower limit detection unit 670, an upper limit detection unit 650, a phase detection unit 690, and a buffer unit 610. A clock 615 generates a data sampling clock signal TCK and first and second edge sampling clock signals LCK and RCK. The data sampling clock signal TCK is generated by delaying a data sampling clock signal TCK generated by an external clock signal generator (not shown), and the first and second edge sampling clock signals LCK and RCK are generated by delaying an edge sampling clock signal generated by the external clock signal generator.

The buffer unit 610 delays received data signals (RX_IN+ and RX_IN-) by a predetermined amount corresponding to a delay indication signal PHASE fed thereto. The buffer unit 610 includes a number of delay elements D corresponding to the number of bits of the delay indication signal PHASE. The buffer unit 610 delays the received data signals (RX_IN+ and RX_IN-) by a predetermined amount by turning on one of a plurality of switches 1 through 12 that is chosen according to the logic level of the delay indication signal-PHASE.

The delayed received data is sampled in response to the data sampling clock signal TCK, and the results of the sampling are input to an internal circuit (not shown). This process is well known to one of ordinary skill in the art to which the present invention pertains, and thus a detailed description of this process will be omitted.

According to an exemplary embodiment, the delay indication signal PHASE is comprised of thirteen bits and has a default logic level of "000 000 1 000 000". Accordingly, the received data signals (RX_IN+ and RX_IN-) are delayed in a default state by passing through seven delay elements D, and the default delayed received data is sampled.

The operation of the deskewing apparatus 600 will hereinafter be described in detail assuming that the operation of the deskewing apparatus 600 begins from a default state, however, it is obvious to one of ordinary skill in the art to which the present invention pertains that exemplary embodiments of the present invention can also be applied to a deskewing apparatus in a state other than a locked state.

Referring to FIG. 6 and FIG. 7, the up/down detection unit 630 performs up/down detection. More specifically, in operation S701, the up/down detection unit 630 determines in which of areas I through III the logic level of a data signal DIN transitions. The up/down detection unit 630 includes an up/down sampler 631 and an up/down detector 633. The up/down sampler 631 samples data output in a default state, that is, the data signal DIN, which is output when the sixth switch 6 illustrated in FIG. 6 is turned on, in response to the data sampling clock signal TCK, the first edge sampling clock signal LCK, and the second edge sampling clock signal RCK.

The up/down detector 633 determines in which of areas I through III the logic level of the data signal DIN transitions using sample data TD, LD, and RD. The sample data TD is a sample value obtained using the data sampling clock signal TCK, the sample data LD is a sample value obtained using the first edge sampling clock signal LCK, and the sample data RD is a sample value obtained using the second edge sampling clock signal RCK.

If the logic level of the data signal DIN is determined to transition in area I, the up/down detector 633 transmits a down signal CDN to the lower limit detection unit 670. If the logic level of the data signal DIN is determined to transition in area II, the up/down detector 633 transmits a center signal CENTER to the phase detection unit 690. If the logic level of the data signal DIN is determined to transition in area III, the up/down detector 633 transmits an up signal CUP to the upper limit detection unit 650.

The operation of the up/down detector 633 will hereinafter be described in further detail with reference to FIGS. 6 through 8. The up/down detector 633 determines in which of areas I through III the logic level of the data signal DIN transitions, and counts the number of times the logic level of the data signal DIN transitions. As described above, the up/down detector 633 counts the number of times the logic level data signal DATA_IN transitions in order to accurately analyse statistical jitter properties. For the convenience of description, assume that the data signal DIN can be used to provide statistically uniform jitter properties when the number of times the logic level of the data signal DIN transitions exceeds a predefined critical logic level N.

If the logic level of the data signal DIN is determined to transition in area I, the up/down detector 633 transmits the down signal CDN so that the lower limit detection unit 670 can detect a lower limit of a probability density function.

Likewise, if the logic level data signal DIN is determined to transition in area III, the up/down detector 633 transmits the up signal CUP so that the upper limit detection unit 650 can detect an upper limit of the corresponding probability density function.

If the number of times the logic level of the data signal DIN transitions exceeds the predefined critical logic level N but the logic level of the data signal DIN has not transitioned in area I or area III, the up/down detector 633 transmits neither the down signal CDN nor the up signal CUP.

In other words, referring to FIG. 7, in operation S711, if the logic level of the data signal DIN is determined in operation S703 to transition in both areas I and III, the up/down detector 633 transmits the down signal CDN, the center signal CENTER, and the up signal CUP so that the upper limit detection unit 650 and the lower limit detection unit 670 can respectively perform upper limit detection and lower limit detection.

If the number of times the logic level of the data signal DIN transitions is determined in operation S705 to have not yet reached the predefined critical logic level N, the up/down detector 633 keeps counting the number of times the logic level of the data signal DIN transitions in operation S709 until the number of times the logic level of the data signal DIN transitions reaches the predefined critical logic level N. In operation S711, if the logic level of the data signal DIN is determined in operation S707 to transition in area I or in both areas I and II, the up/down detector 633 transmits the down signal CDN, or both the down signal CDN and the center signal CENTER so that lower limit detection can be performed.

Also, in operation S711, if the logic level of the data signal DIN is determined in operation S707 to transition in area III or in both area III and area II, the up/down detector 633 transmits the up signal CUP, or both the up signal CUP and the center signal CENTER so that upper limit detection can be performed.

If the logic level of the data signal DIN is determined to transition only in area II, the up/down detector 633 transmits the center signal CENTER. When the up/down detector 633 transmits only the center signal CENTER, neither upper limit detection nor lower limit detection is performed, and the phase detection unit 690 maintains a previously determined delay amount.

The up/down detector 633 may include a counter that counts the number of times the logic level of the data signal DIN transitions. The arrangement of the counter in the up/down detector 633 is obvious to one of ordinary skill in the art to which the present invention pertains, and thus its detailed description will be omitted.

A send signal SEND transmitted by the up/down detector 633 indicates that the logic level of the data signal DIN transitions in area I or area III. In other words, if the logic level of the data signal DIN transitions in area I or area III, the up/down detector 633 transmits the send signal SEND to the upper limit detection unit 650 and the lower limit detection unit 670.

The up/down detector 633 determines that the logic level of the data signal DIN transitions in area I if previous sample values TD(i) and LD(i+1) are different from each other. Also, the up/down detector 633 determines that the logic level the data signal DIN transitions in area II if the previous sample value LD(i+1) and a previous sample value RD(i+1) are different from each other. Also, the up/down detector 633 determines that the logic level of the data signal DIN transitions in area III if the previous sample values RD(i+1) and TD(i+1) are different from each other. One of ordinary skill in the art to which an exemplary embodiment of the present invention pertains can easily realize a logic circuit that detects transitions in the logic level of the data signal DIN using a logic operation such as an exclusive logic AND operation, and thus a detailed description of such a logic circuit will be omitted.

When there is the need to perform upper limit detection or lower limit detection according to detection results provided by the up/down detection unit 630, the upper limit detection unit 650 and/or the lower limit detection unit 670 performs an upper limit detection and/or a lower limit detection. More specifically, if the logic level of the data signal DIN transitions in area I, the lower limit detection unit 670 detects a lower limit of an area where the logic level of the data signal DIN transitions, that is, a lower limit of the corresponding probability density function. On the other hand, if the logic level of the data signal DIN transitions in area III, the upper limit detection unit 650 detects an upper limit of the area where the logic level of the data signal DIN transitions, that is, an upper limit of the probability density function.

The upper limit detection unit 650 includes an upper limit sampler 651 and an upper limit detector 653. The upper limit sampler 651 samples data which is ahead of the data signal DIN by a predetermined amount corresponding to an upper limit sampling control signal UPPER in response to the first and second edge sampling clock signals LCK and RCK.

Referring to FIG. 9, the upper limit detection unit 650 detects an upper limit of the probability density function by repeatedly advancing the data signal DIN by a predetermined amount, for example, 2D, and determining whether the logic level of the resulting advanced data transitions in area II. In other words, the upper limit detection unit 650 determines whether the logic level of data that is 2D earlier than the data signal DIN transitions in area II, and determines whether the logic level of data that is 4D earlier than the data signal DIN transitions in area II. The upper limit detection unit 650 repeatedly performs this determination operation until none of the advanced data of the data signal DIN is detected to transition in area II.

If the advanced data of the data signal DIN is detected to transition in area II, the logic level of the upper sampling control signal UPPER is determined so that further advanced data of the data signal DIN successively can be sampled. More specifically, referring to FIG. 6, if the advanced data of the data signal DIN is detected to transition in area II, the logic level of the upper sampling control signal UPPER<0:2> is sequentially varied from "100" to "010" and from "010" to "001" so that the upper limit sampler 651 can sample further advanced data of the data signal DIN.

The upper limit detector 653 detects an upper limit of a probability density function using advanced data ULD and URD of the data signal DIN which are obtained through sampling using the first and second edge sampling clock signals LCK and RCK. The operations of the upper limit sampler 651 and the upper limit detector 653 will hereinafter be described in further detail with reference to FIGS. 6 and 9.

The upper limit detector 653 outputs a first upper sampling control signal UPPER=100 for sampling first advanced data that is 2D earlier than the data signal DIN. Then, the upper limit sampler 651 samples the first advanced data (in response to the first upper sampling control signal UPPER=100), thereby generating sample data ULD and URD. The upper limit detector 653 determines whether the logic level of the first advanced data transitions in area II by using the sample data ULD and URD.

Referring to FIG. 9, the logic level of the first advanced data that is 2D earlier than the data DIN transitions in area II. Thus, the upper limit detector 653 outputs a second upper sampling control signal UPPER=010 for sampling second advanced data that is 4D earlier than the data signal DIN. Then, the upper limit sampler 651 samples the second advanced data in response to the second upper limit sampling control signal UPPER=010, thereby generating sample data ULD and URD. Then, the upper limit detector 653 determines whether the logic level of the second advanced data transitions in area II by using the sample data ULD and URD.

Referring to FIG. 9, the logic level of the second advanced data transitions in area II. Thus, the upper limit detector 653 outputs a third upper limit sampling control signal UPPER=001 for sampling third advanced data that is 6D earlier than the data signal DIN. Then, the upper limit sampler 651 samples the third advanced data, thereby generating sample data ULD and URD. The upper limit detector 653 determines whether the logic level of the third advanced data transitions in area II by using the sample data ULD and URD.

Referring to FIG. 9, the logic level of the third advanced data does not transition in area II. Thus, the upper limit detector 653 determines −4D as an upper limit, and outputs an upper indication signal UP=010. In order to accurately analyse statistical jitter properties, the upper limit detector 653 counts the number of times the logic level of the third advanced data transitions until the result of the counting reaches the predefined critical logic level N. Thereafter, if the logic level of the third advanced data does not transition in area II while the logic level of the third advanced data of the data signal transitions N times, the upper limit detector 653 determines −4D as an upper limit.

According to an exemplary embodiment of the present invention, 2D must be smaller than the width of area II, that is, ΔT.

The structure and operation of the lower limit detection unit 670 are similar to the structure and operation of the upper limit detection unit 650. The lower limit detection unit 670 includes a lower limit sampler 671 and a lower limit detector 673. The lower limit sampler 671 samples data delayed by a predetermined amount corresponding to a lower limit sampling control signal LOWER in response to the first and second edge sampling clock signals LCK and RCK.

More specifically, referring to FIG. 9, the lower limit detection unit 670 detects a lower limit of a corresponding probability density function by repeatedly delaying the data signal DIN by a predetermined amount, that is, 2D, and determining whether the logic level of the delayed data transitions in area II. More specifically, the lower limit detection unit 670 determines whether the logic level of delayed data that is 2D later than the data signal DIN transitions in area II, and determines whether the logic level of delayed data that is 4D later than the data signal DIN transitions in area II. The lower limit detection unit 670 performs this determination operation until none of the delayed data of the data signal DIN is detected to transition in area II.

If there is delayed data of the data signal DIN detected to transition in area II, the logic level of a lower limit sampling control signal LOWER is determined so that further delayed data of the data signal DIN can be sampled. More specifically, referring to FIG. 6, if there is delayed data of the data signal DIN detected to transition in area II, the logic level of a lower limit sampling control signal LOWER<0:2> is sequentially varied from "100" to "010" and from "010" to "001" so that the lower limit sampler 671 can sample further delayed data of the data signal DIN.

The lower limit detector 673 detects a lower limit of a probability density function using delayed data LLD and LRD of the data signal DIN which are obtained through sampling using the first and second edge sampling clock signals LCK and RCK. The operations of the lower limit sampler 671 and the lower limit detector 673 will hereinafter be described in further detail with reference to FIGS. 6 and 9.

In detail, the lower limit detector 673 outputs a lower sampling control signal LOWER=100 for sampling first delayed data of the data signal DIN that is 2D later than the data signal DIN. Then, the lower limit sampler 671 samples the first delayed data (in response to the lower sampling control signal LOWER=100), thereby generating sample data LLD and LRD. The lower limit detector 673 determines whether the logic level of the first delayed data transitions in area II by using the sample data LLD and LRD.

Referring to FIG. 9, the logic level of the first delayed data transitions in area II. Thus, the lower limit detector 673 outputs a lower limit sampling control signal LOWER=010 for sampling second delayed data of the data signal DIN that is 4D later than the data signal DIN, and outputs a lower limit sampling control signal LOWER=001 for sampling third delayed data of the data signal DIN that is 6D later than the data signal DIN. Then, the lower limit sampler 671 samples the second delayed data and the third delayed data in response to the lower limit sampling control signal LOWER=010 and the lower limit sampling control signal LOWER=010, respectively, thereby generating sample data LLD and LRD. Eventually, the lower limit detector 673 determines 6D as a lower limit, and outputs a lower limit indication signal DN=001.

In order to adequately analyse statistical jitter properties, the lower limit detector 673 counts the number of times the logic level of fourth delayed data of the data signal DIN that is 8D later than the data signal DIN until the result of the counting reaches the predefined critical logic level N. Thereafter, if the logic level of the fourth delayed data does not transition in area II while the logic level of the forth delayed data of the data signal transitions N times, the lower limit detector 673 determines 6D as a lower limit. According to an exemplary embodiment of the present invention, 2D must be smaller than the width of area II, that is, smaller than ΔT.

Detection indication signals UFOUND and LFOUND indicate that the logic level of advanced data of the data signal DIN or the logic level of delayed data of the data signal transitions in area II.

Referring to FIG. 7, in operation S713, the phase detection unit 690 determines the delay amount indicating the degree to which the data signal DIN is to be delayed according to an upper limit and a lower limit obtained in operation S711. More specifically, the phase detection unit 690 may determine the mean of the upper and lower limits obtained in operation S711 as the delay amount. For example, if the upper and lower limits obtained in operation S711 are respectively 6D and −4D, as illustrated in FIG. 9, the phase detection unit 690 may determine D as the delay amount. In this case, the delay indication signal PHASE output by the phase detection unit 690 may have a logic level of "000 000 0 100 000".

If the up/down detection unit 630 determines that the logic level of the data signal DIN transitions only in area II and thus determines the center signal CENTER in operation S707, the phase detection unit 690 maintains the previously determined delay amount in operation S713.

As described above, according to an exemplary embodiment of the present invention, a deskewing operation is performed using a sample signal obtained from a data signal through sampling, thus realizing a digital deskewing operation. In addition, upper limit operation, lower limit information, and delay amount information, which are information needed to perform a deskewing operation, are respectively represented by three digital signals, that is, an upper limit indication signal UP, a lower limit indication signal DN, and a delay indication signal PHASE.

Moreover, according to an exemplary embodiment of the present invention, the deskewing apparatus 600 stores the upper limit indication signal UP, the lower limit indication signal DN, and the delay indication signal PHASE, and can thus readily maintain a locked state when a semiconductor memory device that supports a power down mode is turned on in the power down mode.

Accordingly, the deskewing apparatus 600 may also include a delay information storage unit (not shown) that stores upper and lower limits of a probability density function and a delay amount. The location of the delay information storage unit is not limited to a specific location. In other words, the delay information storage unit may be located inside the deskewing apparatus 600 separate from the buffer unit 610, the up/down detection unit 630, the upper limit detection unit 650, the lower limit detection unit 670, and the phase detection unit 690, or it may be located elsewhere.

Figure 10:
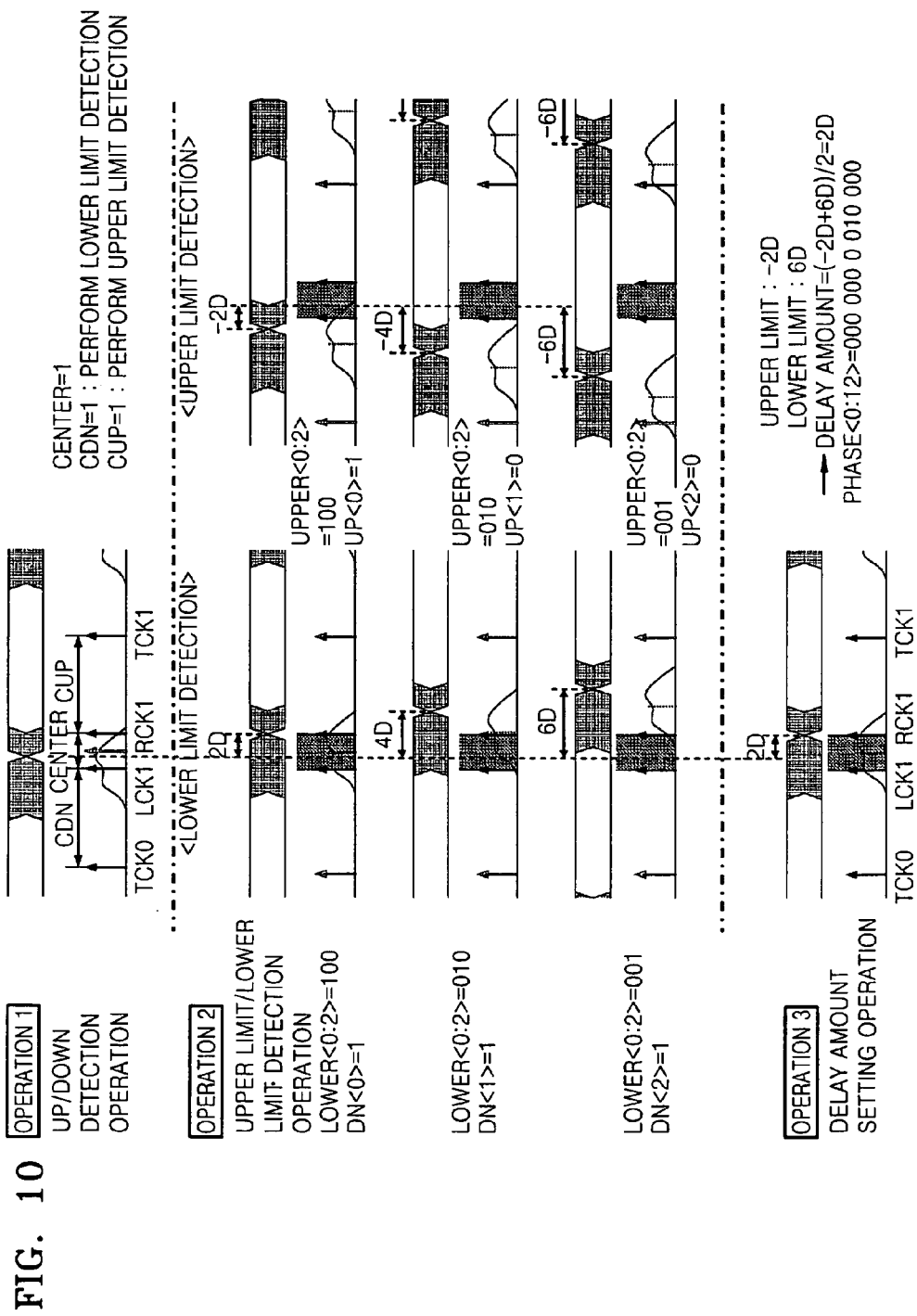
FIGS. 10 and 11 are diagrams for explaining the determining of delay amount according to an exemplary embodiment of the present invention.
Figure 11:
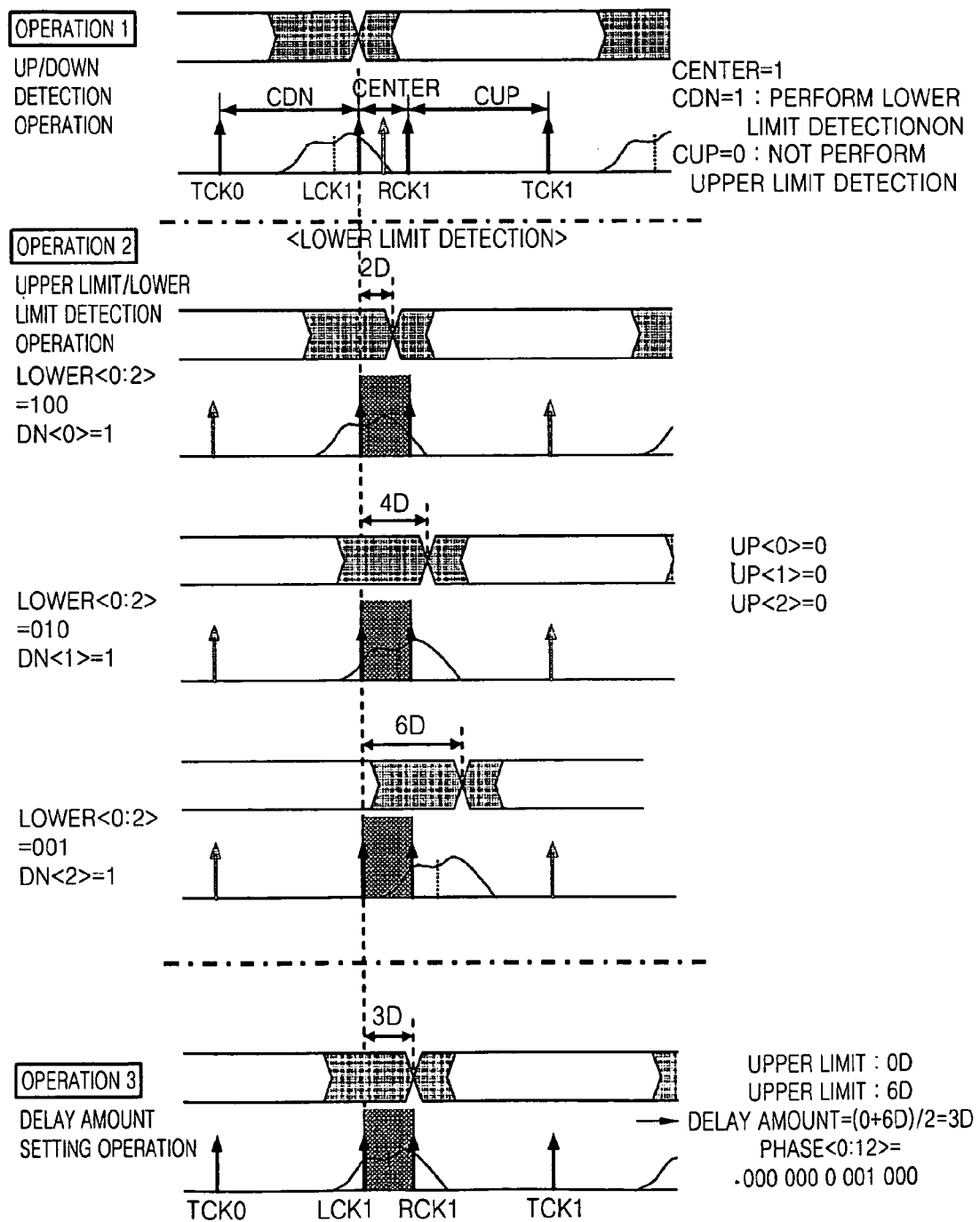

FIGS. 10 and 11 are diagrams for explaining the determining of a delay amount according to an exemplary embodiment of the present invention. Specifically, FIG. 10 illustrates the situation when the logic level of data signal DIN transitions in all of areas I through III while counting the number of times the logic level of the data signal DIN transitions. Referring to FIG. 10, in operation 1, that is, an up/down detection operation, the up/down detector 633 of FIG. 6 transmits an up signal CUP, a down signal CDN, and a center signal CENTER that are all activated.

In operation 2, that is, an upper limit/lower limit detection operation, the upper limit detector 653 of FIG. 6 repeatedly advances the data signal DIN and determines whether the logic level of advanced data of the data signal DIN transitions in area II, thereby detecting an upper limit. Referring to FIG. 10, the logic level of advanced data of the data signal DIN that is 4D earlier than the data signal DIN does not transition in area II. Thus, the upper limit detector 653 determines –2D as an upper limit, and generates an upper limit indication signal UP having a logic level of "100".

Similarly, the lower limit detector 673 of FIG. 6 repeatedly delays the data signal DIN and determines whether the logic level of delayed data of the data signal DIN transitions in area II, thereby detecting a lower limit. Referring to FIG. 10, the logic level of delayed data of the data signal DIN that is 6D later than the current data signal DIN transitions in area II, whereas the logic level of delayed data of the data signal DIN that is 8D later than the data signal DIN does not transition in area II. Accordingly, the lower limit detector 673 determines 6D as a lower limit, and generates a lower limit indication signal DN having a logic level of "001".

In operation 3, that is, a delay amount determination operation, the phase detection unit 690 of FIG. 6 determines the mean of the upper limit determined by the upper limit detector 653 and the lower limit determined by the lower limit detector 673, that is, 2D, as a delay amount, and generates a delay phase signal PHASE having a logic level of "000 000 0 010 000".

FIG. 11 is a diagram for illustrating the situation when the logic level of the data signal DIN does not transition in area III even after the number of times the logic level of the data signal DIN transitions reaches the predefined critical logic level N. Referring to FIG. 11, in operation 1, that is, an up/down detection operation, the up/down detector 633 of FIG. 6 transmits a down signal CDN and a center signal CENTER that are both activated.

In operation 2, that is, an upper limit/lower limit detection operation, unlike operation 2 illustrated in FIG. 10, only a lower limit detection operation is performed. The lower limit detector 673 of FIG. 6 repeatedly delays the data signal DIN and determines whether the logic level of delayed data of the data signal DIN transitions in area II, thereby detecting a lower limit. Referring to FIG. 11, the logic level of delayed data of the data signal DIN that is 6D later than the data signal DIN transitions in area II (this is good now), whereas the logic level of delayed data of the data signal DIN that is 8D later than the data signal DIN does not transition in area II. Accordingly, the lower limit detector 673 determines 6D as a lower limit, and generates a lower limit indication signal DN having a logic level of "001".

In operation 3, that is, a delay amount determination operation, the phase detection unit 690 determines half of the lower limit determined by the lower limit detector 673, that is, 3D, as delay amount, and generates a delay indication signal PHASE having a logic level of "000 000 0 001001".

Figure 12A:
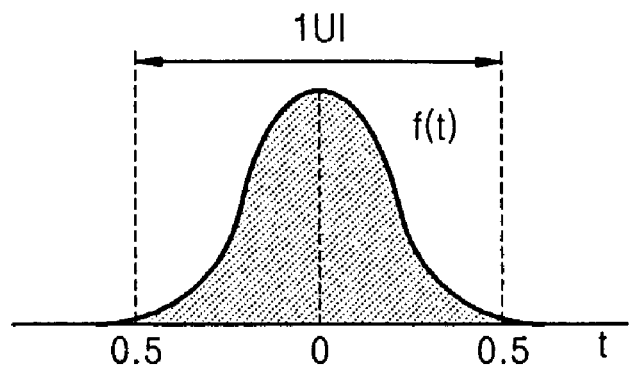
FIG. 12 is a diagram for explaining the performance of a deskewing apparatus according to an exemplary embodiment of the present invention when a jitter probability density function is symmetrical.
Figure 12B:
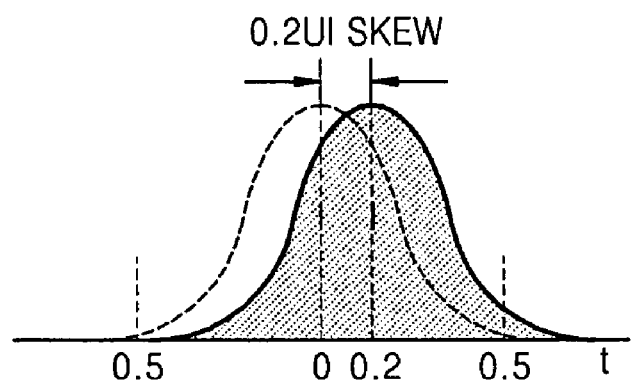
Figure 12C:
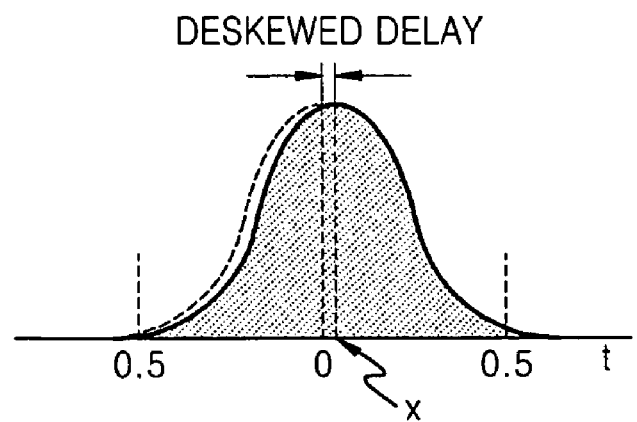
Figure 13A:
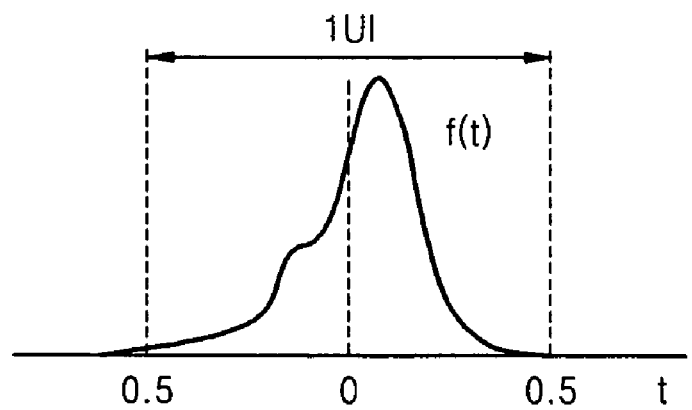
FIG. 13 is a diagram for explaining the performance of a deskewing apparatus according to an exemplary embodiment of the present invention when a jitter probability density function is asymmetrical.
Figure 13B:
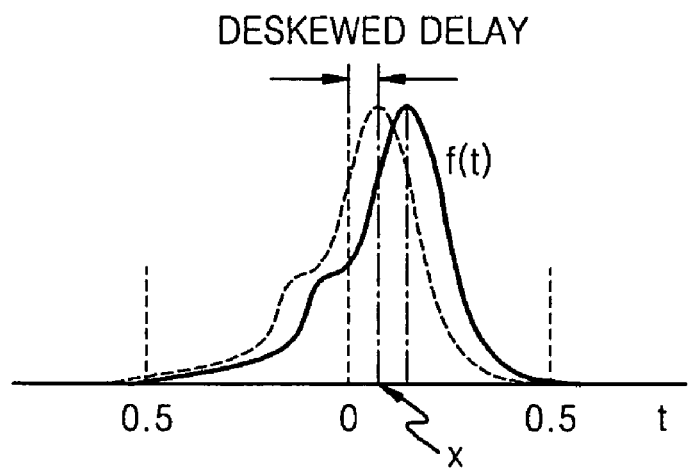

FIGS. 12A-12C are diagrams for explaining the performance of a deskewing apparatus according to an exemplary embodiment of the present invention when a jitter probability density function is symmetrical, and FIGS. 13A and 13B are diagrams for explaining the performance of the deskewing apparatus according to an exemplary embodiment of the present invention when the jitter probability density function is asymmetrical.

Referring to FIGS. 12A-12C and 13A-13B, assume the a data transmission rate of the input data signal is 7, the number of counting times required to adequately analyse statistical properties is 1024 ($=2^{10}$), the two-time oversampling method is used to realize a locked state, and a worst case scenario that the logic value of an input data signal transitions only once when the logic level of the input data signal can transition seven times.

Referring to FIG. 12(A), a probability density function can be represented as a Gaussian probability density function as indicated by Equation (1):

$$f(t) = \frac{1}{\sqrt{2\pi}\,\sigma} e^{-\frac{t^2}{2\sigma^2}} \qquad (1)$$

where σ is a variable that is determined to satisfy a bit error rate (BER) of 10-10. The logic level of the variable σ can be determined by Equation (2):

$$\int_{0.5}^{\infty} f(t)\,dt = 0.5 \times 10^{-10} \qquad (2)$$

where σ=0.007.

Assume a probability density function having a skew of 0.2 Ul and jitters as in the situation illustrated in FIG. 12B. In this case, BER is determined to be $5.22\times10^{-5}$, as indicated by Equation (3):

$$\int_{-\infty}^{-0.7} f(t)\,dt + \int_{0.3}^{\infty} f(t)\,dt = 5.22 \times 10^{-5} \qquad (3)$$

FIG. 12C presents experimental results obtained by performing a deskewing operation according to an embodiment of the present invention when D=0.07 and ΔT=0.20. The experimental results are also presented in Table 1 as follows.

TABLE 1

| x | prob | BER | Improvement ratio |
|---|---|---|---|
| −0.01 | $3.760 \times 10^{-1}$ | $1.38 \times 10^{-11}$ | $3.78 \times 10^5$ |
| 0.06 | $6.235 \times 10^{-1}$ | $6.32 \times 10^{-5}$ | $8.26 \times 10^3$ |
| 0.13 | $2.837 \times 10^{-4}$ | $8.53 \times 10^{-7}$ | $6.12 \times 10^1$ |
| 0.20 | $1.711 \times 10^{-4}$ | $5.22 \times 10^{-5}$ | 1 |
| others | $<10^{-16}$ | — | — |

In Table 1, x represents a deskewed delay, prob represents the logic level of a probability density function, BER represents bit error rate, and Improvement ratio represents the degree to which BER is improved from the BER of FIG. 12(b). As indicated by Table (1), it is possible to improve BER by performing a deskewing operation according to an embodiment of the present invention.

Referring to FIG. 13A, a probability density function can be represented as a two-Gaussian probability density function as indicated by Equation (4):

$$f(t) = \frac{1}{\sqrt{2\pi}\,\sigma}\left(0.8 \times e^{-\frac{(t-0.04)^2}{2\sigma^2}} + 0.2 \times e^{-\frac{(t+0.16)^2}{2\sigma^2}}\right) \qquad (4)$$

where σ is a variable that is determined to satisfy a bit error rate (BER) of 10-10. The variable σ can be determined by Equation (5):

$$\int_{-\infty}^{-0.5} f(t)\,dt + \int_{0.5}^{\infty} f(t)\,dt = 10^{-10} \quad (5)$$

where σ=0.0557.

Assume a probability density function having a skew of 0.2 UI and jitters for the situation illustrated in FIG. 13A. In this case, BER is $1.19 \times 10^{-6}$.

FIG. 13B illustrates experimental results obtained by performing a deskewing operation according to an embodiment of the present invention when D=0.07 and ΔT=0.20. The experimental results are also presented in Table 2 as follows.

TABLE 2

| x | prob | BER | Improvement ratio |
|---|---|---|---|
| −0.01 | $1.764 \times 10^{-7}$ | $3.03 \times 10^{-10}$ | $3.93 \times 10^{3}$ |
| 0.06 | $9.856 \times 10^{-1}$ | $3.30 \times 10^{-13}$ | $3.61 \times 10^{6}$ |
| 0.13 | $7.849 \times 10^{-3}$ | $1.21 \times 10^{-9}$ | $9.83 \times 10^{2}$ |
| 0.20 | $6.600 \times 10^{-3}$ | $1.19 \times 10^{-6}$ | 1 |
| others | $<10^{-16}$ | — | — |

As indicated in Table 2, it is possible to considerably improve BER by performing a deskewing operation according to an embodiment of the present invention. Upon comparing Table 2 with Table 1 (particularly, when x=0.06), it can be seen that the performance of a deskewing apparatus according to an embodiment of the present invention is better when the deskewing apparatus is applied to an asymmetrical probability density function than when the deskewing apparatus is applied to a symmetrical probability density function.

Figure 14:
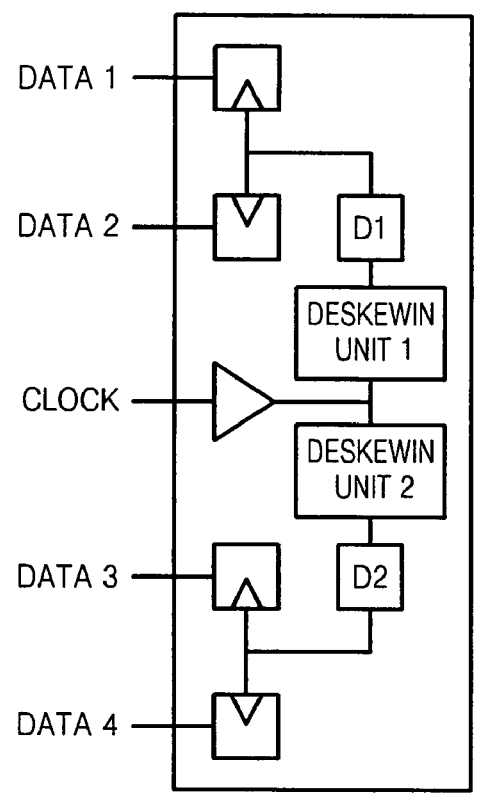
FIGS. 14 through 17 are block diagrams of data reception apparatuses using a deskewing apparatuses according to exemplary embodiments of the present invention.
Figure 15:
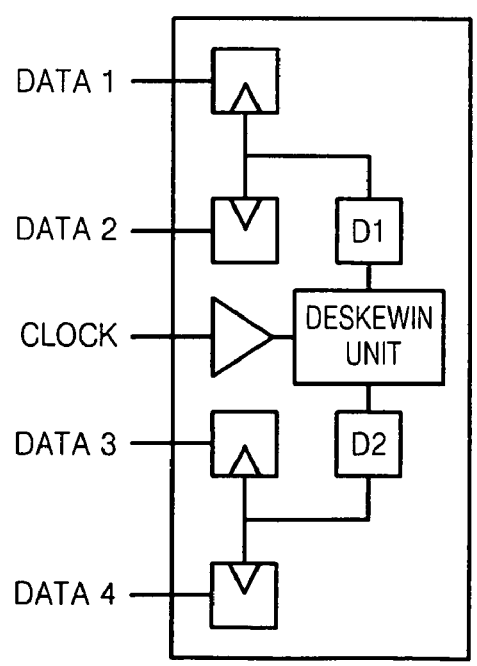
Figure 16:
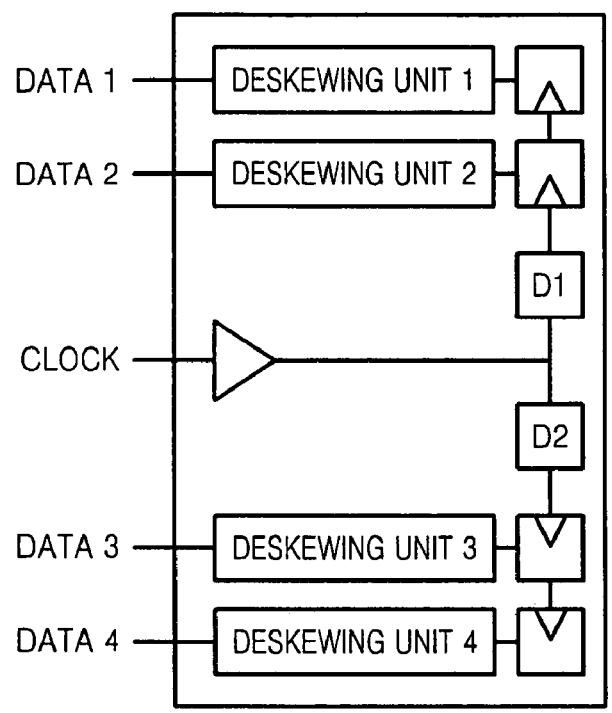
Figure 17:
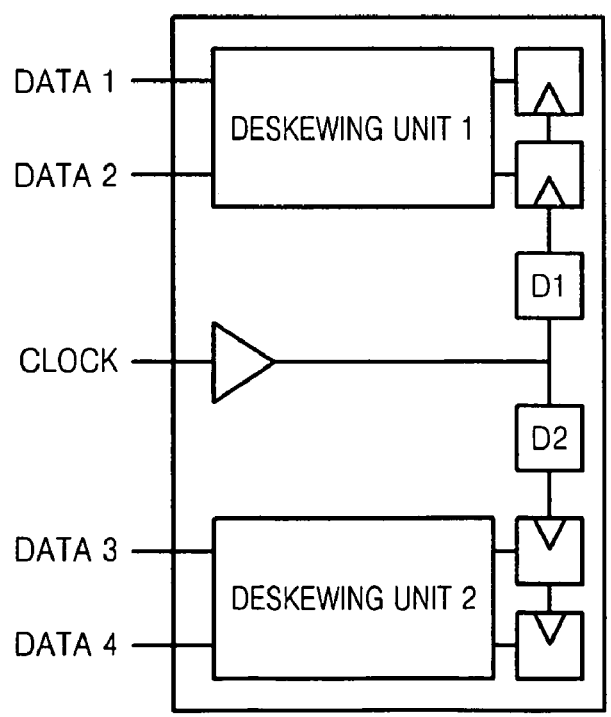

FIGS. 14 through 17 are block diagrams of data signal reception apparatuses where each data reception apparatus uses a deskewing apparatus according to exemplary embodiments of the present invention. More specifically, FIGS. 14 and 15 are block diagrams of data signal reception apparatuses that sample data signals by adjusting a clock signal by a predetermined delay amount determined by a deskewing unit, and FIGS. 16 and 17 are block diagrams of data signal reception apparatuses which sample data signals by adjusting the data signals by a predetermined delay amount determined by a deskewing unit.

Referring to FIGS. 14 through 17, a data signal reception apparatus according to an exemplary embodiment of the present invention receives a plurality of data signals, that is, first through fourth data signals DATA 1 through DATA 4, respectively transmitted via a plurality of data lines and receives a clock signal CLOCK. The data lines are respectively connected to a plurality of data buffer units.

The data buffer units respectively sample the first through fourth data signals DATA 1 through DATA 4 in response to the clock signal CLOCK, and transmit the results of the sampling to a semiconductor memory device as signals. The first through fourth data signals DATA 1 through DATA 4 may include jitter and/or skew for various reasons. In this case, delays D1 and D2 occur between the clock signal CLOCK and the first through fourth data signals DATA 1 through DATA 4. In order for the data buffer units to precisely sample the first through fourth data signals DATA 1 through DATA 4, the delays D1 and D2 need to be offset.

The data reception apparatus according to an exemplary embodiment of the present invention offsets the delays D1 and D2 using the deskewing apparatus and method according to an exemplary embodiment of the present invention. The delays D1 and D2 illustrated in FIGS. 14 through 17 are not elements of the data reception apparatus according to an exemplary embodiment of the present invention but are delays between the clock signal CLOCK and the first through fourth data signals DATA 1 through DATA 4.

The data reception apparatus illustrated in FIG. 14 includes a plurality of data buffer units, a clock signal buffer unit, and a plurality of deskewing units, in this case first and second deskewing units. The data buffer units are respectively connected to a plurality of data lines, and buffer the first through fourth data signals DATA 1 through DATA 4.

Referring to FIG. 14, the clock signal buffer unit buffers the clock signal CLOCK. The first and second deskewing units are each connected to a predefined number of data buffer units and can thus offset jitter and/or skew included in data signals input to the predefined number of data buffer units to which the first and second deskewing units are each connected.

More specifically, referring to FIG. 14, each of the first and second deskewing units is connected to two data buffer units. Accordingly, the first deskewing unit offsets jitter and/or skew included in the first and second data signals DATA 1 and DATA 2, and the second deskewing unit offsets jitter and/or skew included in the third and fourth data signals DATA 3 and DATA 4.

As described above, the data reception apparatus illustrated in FIG. 14 offsets jitter and/or skew included in data signals by adjusting the clock signal CLOCK. More specifically, the first deskewing unit can offset the jitter and/or skew included in the first and second data signals DATA 1 and DATA 2 by advancing or delaying the clock signal CLOCK by a predetermined amount corresponding to the jitter and/or skew included in the first and second data signals DATA 1 and DATA 2. Similarly, the second deskewing unit can offset the jitter and/or skew included in the data signals DATA 3 and DATA 4 by advancing or delaying the clock signal CLOCK by a predetermined amount corresponding to the jitter and/or skew included in the data signals DATA 3 and DATA 4.

The data buffer units can respectively sample the first through fourth data signals DATA 1 through DATA 4 at a precise sampling location in response to a clock signal appropriately adjusted to offset the jitter and/or the skew included in the first through fourth data signals DATA 1 through DATA 4.

The data reception apparatus illustrated in FIG. 15 offsets jitter and/or skew included in a plurality of data signals, that is, first through fourth data signals DATA 1 through DATA 4, by using a single deskewing unit. The data reception apparatus illustrated in FIG. 15 has the same structure as the data reception apparatus illustrated in FIG. 14 except that the data reception apparatus illustrated in FIG. 15 includes only one deskewing unit.

More specifically, the deskewing unit illustrated in FIG. 15 is connected to all of a plurality of data buffer units and offsets the jitter and/or skew included in the first through fourth data signals DATA 1 through DATA 4, which are respectively input to the data buffer units, by appropriately adjusting a clock signal CLOCK by a predetermined amount corresponding to the jitter and/or skew included in the first through fourth data signals DATA 1 through DATA 4.

Referring to FIG. 15, the data buffer units can respectively sample the first through fourth data signals DATA 1 through DATA 4 at a precise sampling location in response to the clock signal adjusted by the deskewing unit.

According to an exemplary embodiment of the present invention, a deskewing unit performs a deskewing operation in a digital manner. Accordingly, a data reception apparatus can store information needed to perform a deskewing operation, that is, information indicating a sampling location such as upper limit information, lower limit information, and delay amount information separately for each of a number of data paths, that is, data pins. Especially when a predefined number of data buffer units are connected to a single deskewing unit, as illustrated in FIG. 14, the information needed to perform a deskewing operation may be stored separately for each of a predefined number of data path groups, that is, data pin groups.

In this case, a unit that stores the information needed to perform a deskewing operation may be located anywhere in a data reception apparatus. In an exemplary embodiment, the information needed to perform a deskewing operation may be stored in a deskewing unit included in a data reception apparatus.

Referring to the data reception apparatuses respectively illustrated in FIGS. 16 and 17, each of a plurality of data signals, that is, first through fourth data signals DATA 1 through DATA 4, is adjusted by a predetermined amount corresponding to jitter and/or skew included in the corresponding data signal, and a plurality of data buffer units respectively sample the adjusted first through fourth data signals DATA 1 through DATA 4 in response to a clock signal CLOCK.

More specifically, the data reception apparatus illustrated in FIG. 16 performs a deskewing operation on each of a plurality of data signals, that is, first through fourth data signals DATA 1 through DATA 4, which are respectively input via a plurality of data paths, which may include data pins and data lines, and receives the deskewed first through fourth data signals DATA 1 through DATA 4 by performing sampling in response to a clock signal CLOCK.

The data reception apparatus illustrated in FIG. 16 includes a plurality of deskewing units, a plurality of data buffer units, and a clock signal buffer unit. The deskewing units are respectively connected to a plurality of data paths. The deskewing units respectively offset jitter and/or skew included in the first through fourth data signals DATA 1 through DATA 4, which are respectively input to the data reception apparatus illustrated in FIG. 16 via the data lines. In other words, the deskewing units respectively offset the jitter and/or skew included in the first through fourth data signals DATA 1 through DATA 4 by adjusting each of the first through fourth data signals DATA 1 through DATA 4 by a predetermined amount corresponding to the jitter and/or skew included in the corresponding data signal.

The data buffer units are respectively connected to the deskewing units and buffer the first through fourth data signals DATA 1 through DATA 4 that are adjusted in response to the clock signal CLOCK by the deskewing units into a semiconductor memory device through sampling, thereby precisely compensating the first through fourth data signals DATA 1 through DATA 4 for jitter and/or skew.

According to an exemplary embodiment, information needed to perform a deskewing operation, that is, information indicating a sampling location, such as upper limit information, lower limit information, and delay amount information can be stored separately for each of a number of data paths, that is, data pin.

A unit that stores the information needed to perform a deskewing operation may be located anywhere in a data reception apparatus. In an exemplary embodiment of the present invention, the information needed to perform a deskewing operation may be stored in each of a plurality of deskewing units included in a data reception apparatus.

Referring to the data reception apparatus illustrated in FIG. 17, a bundle of data lines is connected to a single deskewing unit, and the single deskewing unit performs a deskewing operation on a plurality of data signals. Accordingly, the number of deskewing units included in the data reception apparatus illustrated in FIG. 17 is smaller than the number of deskewing units included in the data reception apparatus illustrated in FIG. 16.

More specifically, referring to FIG. 17, a first deskewing unit is connected to a plurality of data lines through which a plurality of data signals, that is, first and second data signals DATA 1 and DATA 2, are respectively transmitted, and a second deskewing unit is connected to a plurality of data lines through which a plurality of data signals, that is, third and fourth data signals DATA 3 and DATA 4, are respectively transmitted.

Accordingly, the first deskewing unit offsets jitter and/or skew included in the first and second data signals DATA 1 and DATA 2, and the second deskewing unit offsets jitter and/or skew included in the third and fourth data signals DATA 3 and DATA 4.

In other words, the first deskewing unit offsets the jitter and/or skew included in the first and second data signals DATA 1 and DATA 2 by appropriately adjusting the first and second data signals DATA 1 and DATA 2 by a predetermined amount corresponding to the jitter and/or skew included in the first and second data signals DATA 1 and DATA 2, and the second deskewing unit offsets the jitter and/or skew included in the third and fourth data signals DATA 3 and DATA 4 by appropriately adjusting the third and fourth data signals DATA 3 and DATA 4 by a predetermined amount corresponding to the jitter and/or skew included in the third and fourth data signals DATA 3 and DATA 4.

The data reception apparatus illustrated in FIG. 17 can be expanded into a data reception apparatus capable of performing a deskewing operation on all of a plurality of data signals respectively input via a plurality of data lines at the same time. In this case, the data reception apparatus capable of performing a deskewing operation on all of a plurality of data signals respectively input via a plurality of data lines at the same time has the same structure as the data reception apparatus illustrated in FIG. 17 except that it includes only one deskewing unit. Thus, a detailed description of the structure of the data reception apparatus capable of performing a deskewing operation on all of a plurality of data signals respectively input via a plurality of data lines at the same time will be skipped.

According to an exemplary embodiment of the present embodiment, information needed to perform a deskewing operation, that is, information indicating a sampling location, such as upper limit information, lower limit information, and delay amount information can be stored separately for each of a number of data paths. Alternatively, if a predefined number of data paths are connected to a single deskewing unit, as illustrated in FIG. 17, the information needed to perform a deskewing operation can be stored separately for each of a predefined number of data path groups, that is, data pin groups).

In this case, a unit that stores the information needed to perform a deskewing operation may be located anywhere in a data reception apparatus. Preferably, the information needed to perform a deskewing operation may be stored in each of a plurality of deskewing units included in a data reception apparatus.

As described above, the deskewing apparatus according to an exemplary embodiment of the present invention can efficiently reduce data skews and thus optimize data sampling by performing a deskewing operation in a digital manner. Also, the deskewing apparatus according to the present invention can minimize data restoration errors by reducing accumulation of jitters.

In addition, the deskewing apparatus according to an exemplary embodiment of the present invention can reduce lock time, and stores optimized sampling location information as a digital value. Thus, the deskewing apparatus according to the present invention can readily use previous sampling location information when being powered on in a power down mode.

Moreover, the deskewing apparatus according to and exemplary embodiment of the present invention can determine an optimum sampling location using an upper limit and a lower limit of a jitter distribution, and can thus minimize BER regardless of whether the jitter distribution is symmetrical or asymmetrical.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A deskewing method comprising:
   (i) sampling a received data signal in response to a data sampling clock signal, a first edge sampling clock signal, and a second edge sampling clock signal and determining in which of first through third areas the logic level of the received data signal transitions by using the results of the sampling using an up/down detection unit, wherein the data sampling clock signal, the first edge sampling clock signal, and the second edge sampling clock signal are sequentially activated;
   (ii) detecting an upper limit and/or a lower limit in whichever of the first through third areas the logic level of the sampled data transitions according to the results of the determining performed in step (i) using an upper limit detection unit; and
   (iii) delaying the sampled data by a delay amount determined according to the detected upper limit and/or lower limit using a buffer unit.

2. The deskewing method of claim 1, wherein step (ii) comprises, if the results of the determining performed in step (i) indicate that the logic level of the data signal transitions in all of the first through third areas, detecting an upper limit and a lower limit in the first through third areas.

3. The deskewing method of claim 2, wherein step (ii) further comprises:
   if the results of the determining performed in step (i) indicate that the logic level of the data signal transitions in the first area or in the first and second areas, detecting a lower limit in the first area or the first and second areas; and
   if the results of the determining performed in step (i) indicate that the logic level of the data signal transitions in the third area or in the second and third areas by the time the number of times the logic level of the data signal transitions reaches a predefined critical value, detecting an upper limit of the third area or of the second and third areas.

4. The deskewing method of claim 2, wherein the detecting of a lower limit of an area where the logic level of the data signal transitions comprises:
   determining whether the logic level of delayed data obtained by delaying the data signal by a predetermined amount transitions in the second area;
   if the logic level of the delayed data transitions in the second area, determining whether the logic level of further delayed data obtained by delaying the data signal by twice the predetermined amount transitions in the second area; and
   if the logic level of yet further delayed data obtained by delaying the data signal by a multiple of the predetermined amount does not transition in the second area by the time the number of times the logic level of the yet further delayed data signal transitions reaches a predefined critical value, determining the multiple of the predetermined amount as the lower limit.

5. The deskewing method of claim 4, wherein the predetermined amount is less than the width of the second area.

6. The deskewing method of claim 2, wherein the detecting of an upper limit of an area where the logic level of the data signal transitions comprises:
   determining whether the logic level of advanced data obtained by advancing the data signal by a predetermined amount transitions in the second area;
   if the logic level of the advanced data transitions in the second area, determining whether the logic level of further advanced data obtained by advancing the data signal by twice the predetermined amount transitions in the second area; and
   if the logic level of yet further advanced data obtained by advancing the data signal by a multiple of the predetermined amount does not transition in the second area by the time the number of times the logic level of the yet further advanced data signal transitions reaches a predefined critical value, determining the multiple of the predetermined amount as the upper limit.

7. The deskewing method of claim 6, wherein the predetermined amount is less than the width of the second area.

8. The deskewing method of claim 1, wherein step (iii) comprises determining one of half of the upper limit, half of the lower limit, or the mean of the upper and lower limits to be the predetermined delay amount.

9. The deskewing method of claim 8, wherein step (iii) further comprises, maintaining a previous delay amount if the logic level of the data signal transitions only in the second area.

10. A deskewing apparatus comprising:
    an up/down detection unit that samples a data signal received in response to a data sampling clock signal, a first edge sampling clock signal, and a second edge sampling clock signal and that determines in which of first through third areas of the data signal the logic level of data signal obtained as the result of the sampling transitions, wherein the data sampling clock signal, the first edge sampling clock signal, and the second edge sampling clock signal are sequentially activated;
    a lower limit detection unit that detects a lower limit of the first area if the logic level of the data signal transitions in the first area;
    an upper limit detection unit that detects an upper limit of the third area if the logic level of the data signal transitions in the third area;
    a phase detection unit that determines a delay amount indicating the amount by which the data signal is to be delayed according to the upper limit detected by the upper limit detection unit and the lower limit detected by the lower limit detection unit; and
    a buffer unit that delays the data signal by the delay amount determined by the phase detection unit.

11. The deskewing apparatus of claim 10, wherein the up/down detection unit comprises:

an up/down sampler that samples the received data signal in response to the data sampling clock signal, the first edge sampling clock signal, and the second edge sampling clock signal; and an up/down detector that determines in which of the first through third areas the logic level of the data signal transitions.

12. The deskewing apparatus of claim 11, wherein the up/down detector transmits a down signal to the lower limit detection unit if the logic level of the data signal transitions in the first area, transmits a center signal to the phase detection unit if the logic level of the data signal transitions in the second area, and transmits an up signal to the upper limit detection unit if the logic level of the data signal transitions in the third area.

13. The deskewing apparatus of claim 12, wherein the up/down detector transmits all of the down signal, the center signal, and the up signal if the logic level of the data signal transitions in all of the first through third areas.

14. The deskewing apparatus of claim 12, wherein the up/down detector transmits the down signal or the down signal and the center signal if the logic level of the data signal transitions in the first area or in the first and second areas, respectively, until the number of times the logic level of the data signal transitions reaches a predefined critical value.

15. The deskewing apparatus of claim 12, wherein the up/down detector transmits the up signal or the up signal and the center signal if the logic level of the data signal transitions in the third area or in the second and third areas, respectively, until the number of times the logic level of the data signal transitions reaches a predefined critical value.

16. The deskewing apparatus of claim 12, wherein the up/down detector transmits only the center signal if the logic level of the data signal transitions only in the second area until the number of times the logic level of the data signal transitions reaches a predefined critical value.

17. The deskewing apparatus of claim 14, wherein the up/down detector comprises a counter that counts the number of times the logic level of the data signal transitions up to the predefined critical value.

18. The deskewing apparatus of claim 10, wherein the lower limit detection unit comprises:

a lower limit sampler that samples, in response to the first and second edge sampling clock signals, delayed data that is obtained by delaying the data signal by a predetermined amount corresponding to a lower limit sampling control signal; and a lower limit detector that detects the lower limit using the sampled delayed data provided by the lower limit sampler.

19. The deskewing apparatus of claim 18, wherein the lower limit detector determines whether delayed data of the data signal is detected to transition in the second area by using the sampled delayed data provided by the lower limit sampler, wherein if the delayed data of the data signal is detected to transition in the second area, the lower limit detector generates a lower limit sampling control signal for sampling further delayed data of the data signal that is delayed more than the delayed data detected to transition in the second area by a predetermined amount, and, if the logic level of yet further delayed data of the data signal that is delayed more than the data by a multiple of the predetermined amount does not transition by the time the number of times the logic level of the yet further delayed data transitions reaches a predefined critical value, the lower limit detector determines the multiple of the predetermined amount as the lower limit.

20. The deskewing apparatus of claim 19, wherein the predetermined amount is less than the width of the second area.

21. The deskewing apparatus of claim 10, wherein the upper limit detection unit comprises:

an upper limit sampler that samples, in response to the first and second edge sampling clock signals, advanced data obtained by advancing the data signal by a predetermined amount corresponding to an upper limit sampling control signal; and an upper limit detector that detects the upper limit using the sampled advanced data provided by the upper limit sampler.

22. The deskewing apparatus of claim 21, wherein the upper limit detector determines whether the logic level of the advanced data of the data signal is detected to transition in the second area by using the sampled advanced data provided by the lower limit sampler, wherein if the logic level of the advanced data of the data signal is detected to transition in the second area, the lower limit detector generates an upper limit sampling control signal for sampling further advanced data of the data signal that is earlier than the advanced data detected to transition in the second area by a predetermined amount, and, if the logic level of yet further advanced data of the data signal that is earlier than the data signal by a multiple of the predetermined amount does not transition by the time the number of times the logic level of the yet further delayed data transitions reaches a predefined critical value, the upper limit detector determines the multiple of the predetermined amount as the upper limit.

23. The deskewing apparatus of claim 22, wherein the predetermined amount is less than the width of the second area.

24. The deskewing apparatus of claim 10, wherein the phase detection unit determines the delay amount to be one of half of the upper limit, half of the lower limit, and the mean of the upper and lower limits, and maintains a previous delay amount if the logic level of the data signal transitions only in the second area.

25. The deskewing apparatus of claim 10, wherein the phase detection unit comprises a storage unit that stores the upper limit and/or the lower limit, and the delay amount.

26. The deskewing apparatus of claim 10, wherein the buffer unit comprises a number of delay elements corresponding to the number of bits of a signal indicating the delay amount, wherein the delay elements are connected to one another in series.

27. The deskewing apparatus of claim 26, wherein an output of one of the delay elements that corresponds to the signal indicating the delay amount is sampled in response to the data sampling clock signal, and the result of the sampling is output.

28. The deskewing apparatus of claim 10, further comprising a data reception apparatus that receives a plurality of data signals respectively transmitted via a plurality of data lines and a clock signal, the data reception apparatus comprising:

a plurality of data buffer units that are respectively connected to the data lines and buffer the plurality of data signals; and a clock signal buffer unit that buffers the clock signal, wherein the deskewing apparatus is connected to a predefined number of data buffer units of the data buffer units and compensates for jitter and skew included in the plurality of data signals respectively input to the predefined number of data buffer units by adjusting the clock signal by an amount corresponding to the jitter and skew, and the data buffer units respectively buffer the plurality of data in response to the adjusted clock signal.

29. The deskewing apparatus of claim 10, further comprising a data reception apparatus that receives a plurality of data signals respectively transmitted via a plurality of data lines and a clock signal, the data reception apparatus comprising:
    a plurality of data buffer units which are respectively connected to the data lines and buffer the plurality of data signals; and
    a clock signal buffer unit which buffers the clock signal,
    wherein the deskewing apparatus is connected to the data buffer units and compensates for jitters and skews included in a plurality of data respectively input to the data buffer units by adjusting the clock signal by an amount corresponding to the jitters and skews, and the data buffer units respectively buffer the plurality of data signals in response to the adjusted clock signal.

30. The deskewing apparatus of claim 10 further comprising a data reception apparatus and a plurality of deskewing apparatuses respectively connected to a plurality of data lines that can receive a plurality of data signals respectively transmitted via the data lines and a clock signal, wherein the data reception apparatus compensating for jitter and/or skew included in one of the plurality of data signals by adjusting the corresponding data signal by an amount corresponding to the jitter and/or skew, the data reception apparatus comprising:
    a plurality of data buffer units which are respectively connected to the deskewing apparatuses and buffer the data signals adjusted by the deskewing apparatuses; and
    a clock signal buffer unit that buffers the clock signal,
    wherein the data buffer units respectively buffer the data signals adjusted by the deskewing apparatuses in response to the clock signal.

31. The deskewing apparatus of claim 10 further comprising a data reception apparatus and a plurality of deskewing apparatuses that receives a plurality of data signals respectively transmitted via a plurality of data lines and a clock signal, being connected to a predefined number of data lines, and compensating for jitter and/or skew included in the data signals transmitted via the predefined number of lines by adjusting the corresponding data signals by a predetermined amount corresponding to the jitter and/or skew, the data reception apparatus comprising:
    a plurality of data buffer units that respectively correspond to the data lines, wherein each of the deskewing units is connected to a predefined number of data buffer units of the plurality of data buffer units and the predefined number of data buffer units buffer the data signals adjusted by the deskewing unit to which the predefined number of data buffer units are connected; and
    a clock signal buffer unit that buffers the clock signal,
    wherein the data buffer units buffer the data signals adjusted by the deskewing units in response to the clock signal.

32. The deskewing apparatus of claim 10, further comprising a data reception apparatus that receives a plurality of data signals respectively transmitted via a plurality of data lines and a clock signal, the deskewing apparatus being connected to the data lines and compensating for jitter and/or skew included in each of the plurality of data signals by adjusting the corresponding data by an amount corresponding to the jitter and/or skew, the data reception apparatus comprising:
    a plurality of data buffer units that are connected to the deskewing apparatus, respectively correspond to the data lines, and buffer the data signals adjusted by the deskewing apparatus; and
    a clock signal buffer unit that buffers the clock signal,
    wherein the data buffer units buffer the data signals adjusted by the deskewing units in response to the clock signal.

* * * * *